US012500334B2

(12) United States Patent
You et al.

(10) Patent No.: US 12,500,334 B2
(45) Date of Patent: Dec. 16, 2025

(54) TRANSPARENT ANTENNA MODULE AND METHOD FOR MANUFACTURING THE SAME

(71) Applicant: LG ELECTRONICS INC., Seoul (KR)

(72) Inventors: Dongjoo You, Seoul (KR); Junseok Lee, Seoul (KR); Seongmoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 18/381,414

(22) Filed: Oct. 18, 2023

(65) Prior Publication Data

US 2024/0162601 A1 May 16, 2024

(30) Foreign Application Priority Data

Nov. 11, 2022 (KR) ........................ 10-2022-0150776
Jan. 5, 2023 (KR) ........................ 10-2023-0001820
Jul. 12, 2023 (KR) ........................ 10-2023-0090600

(51) Int. Cl.
*H01Q 1/38* (2006.01)
*H01Q 1/32* (2006.01)

(52) U.S. Cl.
CPC ................. *H01Q 1/38* (2013.01); *H01Q 1/32* (2013.01)

(58) Field of Classification Search
CPC ........... H01Q 1/38; H01Q 1/32; H01Q 1/1271
See application file for complete search history.

(56) References Cited

U.S. PATENT DOCUMENTS 5,284,376 A * 2/1994 Zweigart .................. B60J 3/007 296/96.19
5,355,144 A 10/1994 Walton et al.
6,320,276 B1 11/2001 Sauer
6,552,690 B2 * 4/2003 Veerasamy .......... H01Q 1/1271 343/711
9,837,707 B2 * 12/2017 Villarroel .......... B32B 17/10376
10,737,469 B2 * 8/2020 Droste .............. B32B 17/10293
11,772,367 B2 * 10/2023 Benedetto ......... B32B 17/10174 428/192
2019/0348743 A1 11/2019 Song et al.
2022/0284164 A1 9/2022 Scherer et al.

FOREIGN PATENT DOCUMENTS

CN 102407753 A 4/2012

* cited by examiner

*Primary Examiner* — Seung H Lee
(74) *Attorney, Agent, or Firm* — Birch, Stewart, Kolasch & Birch, LLP

(57) ABSTRACT

An antenna assembly for a vehicle can include a first glass including a black mask region; a second glass disposed opposite to the first glass; a film layer disposed between the first glass and the second glass; a transparent substrate disposed in an inner region of the film layer, the transparent substrate including an antenna transparent electrode portion; and a substrate and a feed line disposed on the substrate, the feed line being electrically connected to the antenna transparent electrode portion of the transparent substrate, in which at least a portion of the antenna transparent electrode portion overlaps with the black mask region, at least a portion of the feed line is disposed to overlap the black mask region.

20 Claims, 17 Drawing Sheets

(a)

(b)

(c)

(a)

(b)

(c)

TRANSPARENT ANTENNA MODULE AND METHOD FOR MANUFACTURING THE SAME

CROSS-REFERENCE TO RELATED APPLICATION

Pursuant to 35 U.S.C. § 119(a), this application claims the benefit of the earlier filing date and the right of priority to Korean Patent Applications No. 10-2022-0150776, filed in the Republic of Korea, on Nov. 11, 2022, No. 10-2023-0001820, filed in the Republic of Korea, on Jan. 5, 2023, and No. 10-2023-0090600, filed in the Republic of Korea, on Jul. 12, 2023, the contents of all these applications are incorporated by reference herein into the present application in their entirety.

TECHNICAL FIELD

The present disclosure relates to a transparent antenna module. One more particular implementation relates to an antenna assembly for a vehicle, in which a transparent antenna module is disposed, and a method for manufacturing the same.

BACKGROUND

As communication technologies are developed from 4G (LTE) to 5G communication, antennas for vehicle continuously demand network expandability from the related art FMIAM antennas or LTE antennas to 5G antennas or V2X antennas.

From the beginning of 5G communication in earnest, antennas for a vehicle have been expanded to antennas for 5G Sub6, V2X communication, and the like supporting high frequencies from antennas for FMIAM, LTE (4G) and global navigation satellite system (GNSS) communications. Therefore, the antennas for a vehicle can be expanded variously to shark fin antennas, In-dash antennas, In-spoiler antennas, side-mirror type antennas, and the like, in consideration of performance, design, network continuity.

However, 5G signals exhibit high linearity as frequencies rise, and if there is an obstacle, it can lead to a signal loss. In order to minimize a signal loss in a 5G band, it is advantageous in view of signal transmission and reception that antennas are disposed as close as possible to an exterior of a vehicle at which obstacles can be minimized.

The related art shark fin antenna is mounted on the exterior of a vehicle, which is advantageous for signal transmission and reception. However, due to a limitation in space for installing 5G, V2X, and satellite antennas, network expandability is restricted. Therefore, there are various requirements for implementing antennas, for example, network expandability capable of supporting future high-speed communication, design flexibility not to interfere with a design of the vehicle, installation facilitation to be actually mounted on the vehicle, and the like, as well as antenna performance including the signal loss.

In this regard, a transparent antenna disposed on vehicle glass is recognized as a next-generation antenna, in terms of no interference with vehicle design and high network expandability as well as implementation as a high-performance antenna.

Since the transparent antenna can be installed on various positions, such as front glass, rear glass, side glass, ceiling glass, side mirror, front lamp, and the like, it is very advantageous in that it can be installed while maintaining its own design and communication configuration. On the other hand, the transparent antenna is manufactured based on a transparent film and thereby has low wear resistance with respect to scratches and the like. This urges consumer's caution.

SUMMARY OF THE DISCLOSURE

One aspect of the present disclosure is to solve the aforementioned problems and other drawbacks. Another aspect of the present disclosure is to provide an antenna assembly for a vehicle, in which a transparent antenna module is disposed, and a method for manufacturing the same.

Another aspect of the present disclosure is to provide a transparent antenna for a vehicle, capable of minimizing a signal loss owing to invisible installation on vehicle glass and capable of being expanded to a 5G or V2X antenna owing to no limitation in installation area and space.

Another aspect of the present disclosure is to provide an antenna assembly for a vehicle, provided therein with a transparent antenna module which does not spoil appearance of the vehicle and is applicable to various types of vehicles.

Another aspect of the present disclosure is to propose a transparent antenna structure and a material thereof, capable of increasing wear resistance without limitations in scenes where a consumer actually uses a transparent antenna.

Another aspect of the present disclosure is to propose a transparent antenna structure for a vehicle and a material thereof, capable of improving wear resistance to overcome disadvantages of the transparent antenna.

Another aspect of the present disclosure is to provide a transparent antenna that is free from scratches, cleaning, and the like by proposing a transparent antenna structure and a material thereof in a structure, in which vehicle glass is implemented as double-bonded glass.

Another aspect of the present disclosure is to provide an antenna assembly for a vehicle, provided with a transparent antenna module, which is applicable to a 5G communication vehicle, an autonomous vehicle, and the like, and a method for manufacturing the same.

To achieve those aspects and other advantages of the present disclosure, there is provided an antenna assembly for a vehicle that includes first glass having a black mask region on one surface thereof, second glass disposed opposite to the first glass; a film layer disposed between the first glass and the second glass; a transparent substrate disposed in an inner region of the film layer and having an antenna transparent electrode portion in a mesh structure; and a substrate having a feed line electrically connected to the antenna transparent electrode portion of the transparent substrate.

According to an embodiment, at least a portion of the antenna transparent electrode portion can be disposed in an outer region of the black mask region, and at least a portion of the feed line can be disposed to overlap the black mask region.

According to an embodiment, the first glass can be disposed to face an inner region of the vehicle, and the second glass can be s disposed to face an outer region of the vehicle. The first glass and the second glass can be bonded by the film layer to form a double-bonded glass structure. The film layer can be a polyvinyl butyral (PVB) layer.

According to an embodiment, one end portion of the feed line overlapping the black mask region can be connected to the antenna transparent electrode portion. The feed line can extend to a side surface portion of the double-bonded glass structure, and another end portion of the feed line can be connected to a connector disposed on the black mask region.

According to an embodiment, the substrate having the feed line can be configured as a flexible substrate, and the transparent substrate and the flexible substrate can be bonded to the first glass or the second glass through a bonding layer. A height from the bonding layer to an upper end portion of the flexible substrate can be in a range of 30 to 200 μm, and a height from the transparent substrate to the bonding layer can be in a range of 30 to 300 μm.

According to an embodiment, the antenna assembly can further include a first primer layer and a second primer layer formed on one surface and another surface of the transparent substrate. One surface and another surface of the second primer layer can be bonded to the another surface of the transparent substrate and one surface of a resin layer, on which the antenna transparent electrode portion is formed.

According to an embodiment, another surface of the resin layer can be bonded to the second glass through a bonding layer. The PVB layer can have a thickness in a predetermined range based on 760 μm, and a height from the transparent substrate to the bonding layer can be in a range of 30 to 300 μm.

According to an embodiment, another surface of the resin layer can be bonded to the first glass through a bonding layer. The PVB layer can have a thickness in a predetermined range based on 760 μm, and a height from the transparent substrate to the bonding layer can be in a range of 30 to 300 μm.

According to an embodiment, the PVB layer can include a first PVB layer bonded to the second glass, and a second PVB layer bonded to the first PVB layer and the first glass. The another surface of the resin layer can be bonded to the first PVB layer through the bonding layer. The PVB layer can be formed in a range of 1 to 3 mm, and a height from the transparent substrate to the bonding layer can be in a range of 30 to 300 μm.

According to an embodiment, the PVB layer can include a first PVB layer bonded to the second glass, and a second PVB layer bonded to the first PVB layer and the first glass. The transparent substrate can be disposed between the first PVB layer and the second PVB layer, and the feed line formed on the substrate can be formed through a side surface of the second PVB layer to have a first length.

According to an embodiment, the transparent substrate and the substrate can be bonded to the second glass through a bonding layer, and the feed line formed on the substrate can be formed through a side surface of the PVB layer to have a second length.

According to an embodiment, the transparent substrate and the substrate can be bonded to the first glass through a bonding layer, and the feed line formed on the substrate can be formed through a side surface of the bonding layer to have a third length.

According to an embodiment, the feed line can include a feed line electrode portion and a feed line connecting portion disposed on a first layer. The antenna transparent electrode portion disposed on the first layer can be formed integrally with an antenna connecting portion disposed on a second layer, and the feed line connecting portion disposed on the first layer can be bonded to the antenna connecting portion disposed on the second layer through an anisotropic conductive film (ACF) film.

According to an embodiment, the antenna transparent electrode portion can be formed as a first metal mesh pattern, and the antenna connecting portion can be formed as a second metal mesh pattern. The feed line connecting portion can be formed as a third metal pattern. The second metal mesh pattern of the antenna connecting portion can be bonded to the third metal pattern of the feed line connecting portion.

According to an embodiment, the first metal mesh pattern can have metal mesh lines having a first width in a first axial direction and a second axial direction. The second metal mesh pattern can have metal mesh lines having a second width in the first axial direction and the second axial direction or in a horizontal axial direction and a vertical axial direction. The third metal pattern can have metal lines formed in the vertical axial direction.

According to an embodiment, the second metal mesh pattern of the antenna connecting portion can have an electrode ratio of 30% to 70%. The third metal mesh pattern of the antenna connecting portion can have an electrode ratio of 30% to 70%. The second width can be wider than the first width, and the antenna transparent electrode portion can have an electrode ratio of 30% or less.

According to an embodiment, the first primer layer and the second primer layer formed of an acrylic material can be bonded on both surfaces of the transparent substrate, a resin layer can be formed on the second primer layer, the transparent electrode portion can be formed on the resin layer, the bonding layer can be formed on the resin layer, and a guide film can be bonded to the bonding layer. The flexible substrate having the feed line thereon can be connected to the transparent electrode portion of the transparent substrate. One end portion of the feed line can be connected to the transparent electrode portion and another end portion can be connected to a connector.

According to an embodiment, the transparent substrate connected to the flexible substrate can be disposed on the second glass, the PVB layer can be formed on the second glass and a top region of the transparent substrate, and the second glass is disposed on a rear surface of the PVB layer. The first glass can be disposed on a front surface of the PVB layer, and the first glass and the second glass are bonded to the PVB layer disposed on the first glass and the second glass by thermally treating the PVB layer. The black mask region can be formed on a front surface of the first glass, and the feed line formed on the flexible substrate can be coupled to a side surface of the double-bonded glass structure and the connector is bonded to the black mask region.

According to an embodiment, the first PVB layer can be disposed on the second glass, and the first glass can be disposed on the second PVB layer. The transparent substrate connected to the flexible substrate can be inserted between the first PVB layer and the second PVB layer.

According to an embodiment, the second PVB layer and the first PVB layer can be pre-bonded to the first glass and the second glass through thermal treatment in a first temperature. An autoclaving process can be performed to bond the second PVB layer and the first PVB layer to the first glass and the second glass through thermal treatment in a second temperature range. A lower-limit value of the second temperature range can be set to a value greater than or equal to an upper-limit value of the first temperature range. The black mask region can be formed on a front surface of the first glass. And According to the present disclosure, a housing bottom plate can be bonded to the black mask region. The feed line formed on the flexible substrate can be coupled to a side surface of the second PVB layer, and the connector can be bonded to the black mask region in a state of being inserted into the housing bottom plate. A housing top plate can be fastened to the housing bottom plate.

Hereinafter, technical effects of a transparent antenna module and a method for manufacturing the same according to the present disclosure will be described.

The present disclosure can provide an antenna assembly for a vehicle, in which a transparent antenna module capable of being used for 5G, V2X, GNSS, and satellite broadcast communications is disposed, and a method for manufacturing the same.

The present disclosure can provide a transparent antenna module that is capable of being installed on side glass, front glass, sunroof, rear glass, side mirror, head lamp and the like of a vehicle, and avoiding limitations in vehicle design, and a method for manufacturing the same.

The present disclosure can provide a transparent antenna module that can maintain high wear resistance of an antenna structure exposed to outside while maintaining bonding force even in various environments such as high temperature, thermal impact, infrared rays, and the like, and a method for manufacturing the same.

The present disclosure can provide an antenna assembly for a vehicle, in which a transparent antenna module having a structure capable of being disposed between double-bonded glass, and a method for manufacturing the same.

The present disclosure can provide an antenna assembly for a vehicle, in which a transparent antenna and a feed line are disposed on a PVB layer between a first glass and a second glass in a glass/PVB/glass structure, and a connector part connected to a TCU of the vehicle is disposed on a black mask region, and a method for manufacturing the same.

The present disclosure can provide an antenna assembly for a vehicle, having a structure in which a transparent antenna is not damaged owing to protection by glass while the transparent antenna and a feed line are invisible to a user of the vehicle, and a method for manufacturing the same.

Further scope of applicability of the present disclosure will become apparent from the following detailed description. It should be understood, however, that the detailed description and specific examples, such as the preferred embodiments of the present disclosure, are given by way of illustration only, since various modifications and alternations within the spirit and scope of the disclosure will be apparent to those skilled in the art.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

DETAILED DESCRIPTION OF THE EMBODIMENTS

Description will now be given in detail according to one or more embodiments disclosed herein, with reference to the accompanying drawings. For the sake of brief description with reference to the drawings, the same or equivalent components can be provided with the same or similar reference numbers, and description thereof will not be repeated. In general, a suffix such as "module" and "unit" can be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. can be used herein to describe various elements, these elements should not be limited by these terms. These terms are generally only used to distinguish one element from another.

It will be understood that when an element is referred to as being "connected with" another element, the element can be connected with the another element or intervening elements can also be present. In contrast, when an element is referred to as being "directly connected with" another element, there are no intervening elements present.

A singular representation can include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps can likewise be utilized.

The features of various embodiments of the present disclosure can be partially or entirely coupled to or combined with each other and can be interlocked and operated in technically various ways, and the embodiments can be carried out independently of or in association with each other.

Hereinafter, a transparent antenna module and a method for manufacturing the same according to the present disclosure will be described in detail. In this regard, FIG. 1 is a view illustrating a vehicle in accordance with an embodiment of the present disclosure.

Figure 1:
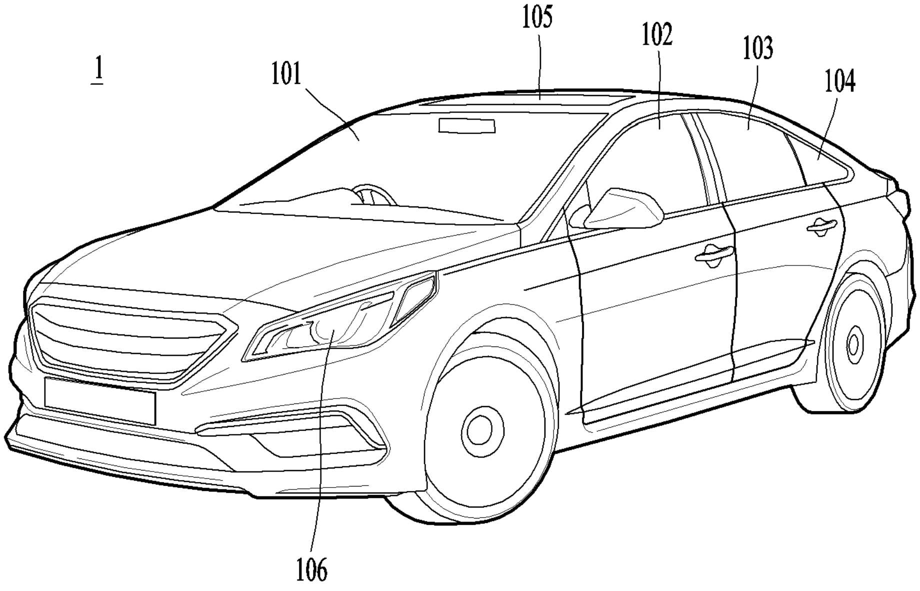
FIG. 1 is a view illustrating a vehicle in accordance with an embodiment of the present disclosure.

Referring to FIG. 1, a vehicle 1 can have at least one communication antenna. The vehicle 1 can transmit and/or receive signals of various frequency bands using the communication antenna. The vehicle 1 can perform communications, such as vehicle-to-vehicle (V2V), vehicle-to-infrastructure (V2I), vehicle-to-pedestrian (V2P), vehicle-to-network (V2N), and the like.

The antenna can include a substrate made of a material such as polyethylene terephthalate (PET), and an antenna pattern formed on the substrate. For example, the antenna can be a transparent antenna.

The antenna can be disposed on a dielectric substance of the vehicle 1. The antenna can be disposed on glass of the vehicle 1. The antenna can be coupled or bonded to a front windshield 101, a door glass 102, 103, a quarter glass 104, a rear windshield, a side mirror, a sunroof 105, or lamp glass 106. For example, the antenna can be a transparent antenna.

Figure 2:
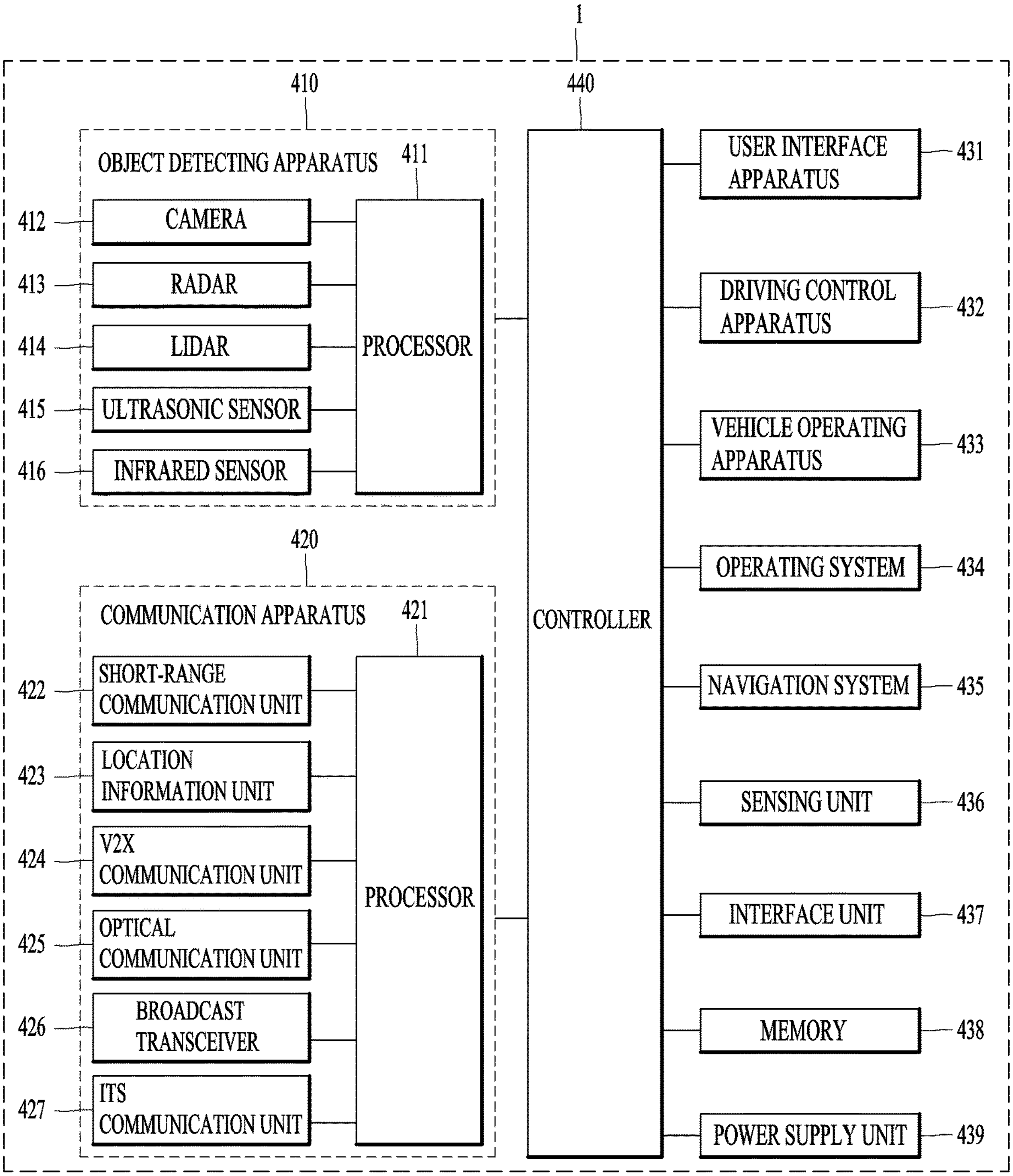
FIG. 2 is a view illustrating a configuration of a vehicle in accordance with an embodiment of the present disclosure.

FIG. 2 is a view illustrating a configuration of a vehicle in accordance with an embodiment of the present disclosure. As illustrated in FIG. 2, the vehicle 1 can include an object detecting apparatus 410, a communication apparatus 420, a user interface apparatus 431, a driving control apparatus 432, a vehicle operating apparatus 433, an operation system 434, a navigation system 435, a sensing unit 436, an interface unit 437, a memory 438, a power supply unit 439, and/or a controller 440. On the other hand, the vehicle 1 can further include other components in addition to those components, or some of those components can be omitted.

The object detecting apparatus 410 can be an apparatus for detecting an object located at outside of the vehicle 1. The object detecting apparatus 410 can include a processor 411, a camera 412, a radar 413, a LiDAR 414, an ultrasonic sensor 415, and/or an infrared sensor 416.

The communication apparatus 420 can be an apparatus for performing communication with an external device. The communication apparatus 420 can perform the communication by including at least one of a transmitting antenna, a receiving antenna, and radio frequency (RF) circuit and RF device for implementing various communication protocols. The communication apparatus 420 can include a processor 421, a short-range communication unit 422, a location information unit 423, a V2X communication unit 424, an optical communication unit 425, a broadcast transceiver 426 and/or an ITS communication unit 427.

The user interface apparatus 431 can be an apparatus for interaction between the vehicle 1 and a user. The vehicle 1 can implement user interfaces (UIs) or user experiences (UXs) through the user interface apparatus 431.

The driving control apparatus 432 is an apparatus for receiving a user input for driving. The vehicle operating apparatus 433 can be an apparatus for electrically controlling operations of various devices within the vehicle 1. The operating system 434 can be a system for controlling various operations of the vehicle 1. The navigation system 435 can provide navigation information. The sensing unit 436 can sense a status of the vehicle 1.

The interface unit 437 can serve as an interface with various types of external devices connected with the vehicle 1. The memory 438 can store basic data for units of the vehicle 1, control data for controlling operations of the units, data that is input or output, and the like. The power supply unit 439 can supply power required for operations of those components. The controller 440 can control an overall operation of each unit within the vehicle 1. The controller 440 can be implemented as an electronic control unit (ECU) and/or a telematics control unit (TCU).

Figure 3:
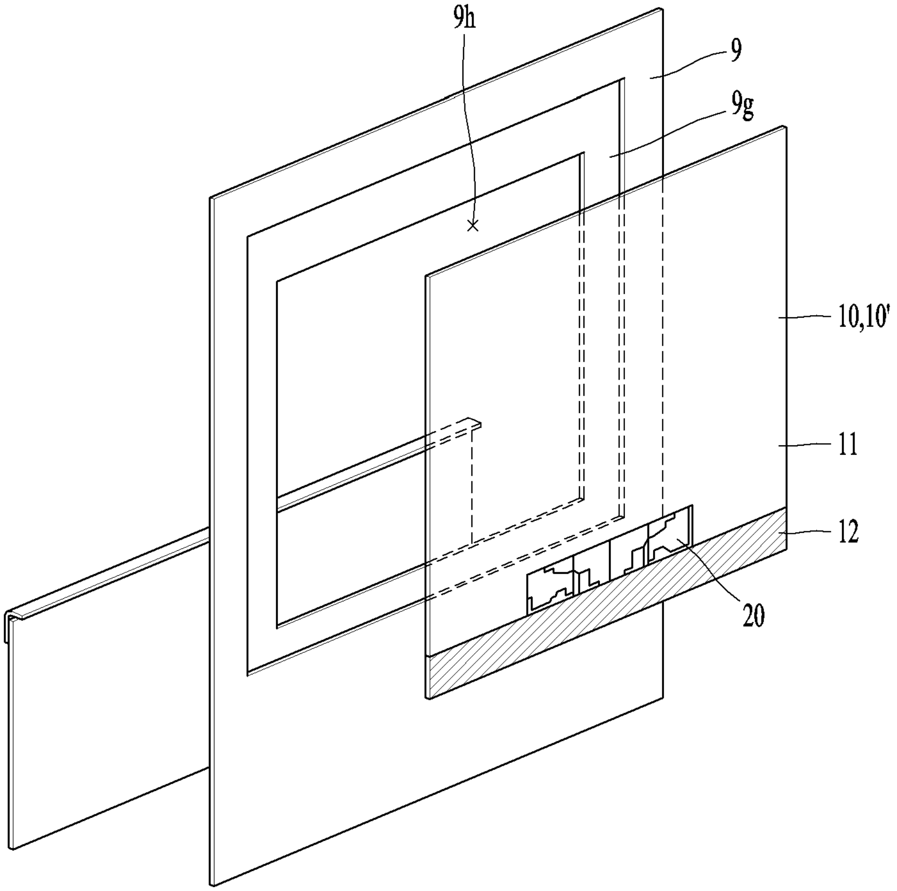
FIG. 3 is a perspective view illustrating vehicle glass to be coupled or attachable to a frame of a vehicle.
Figure 4:
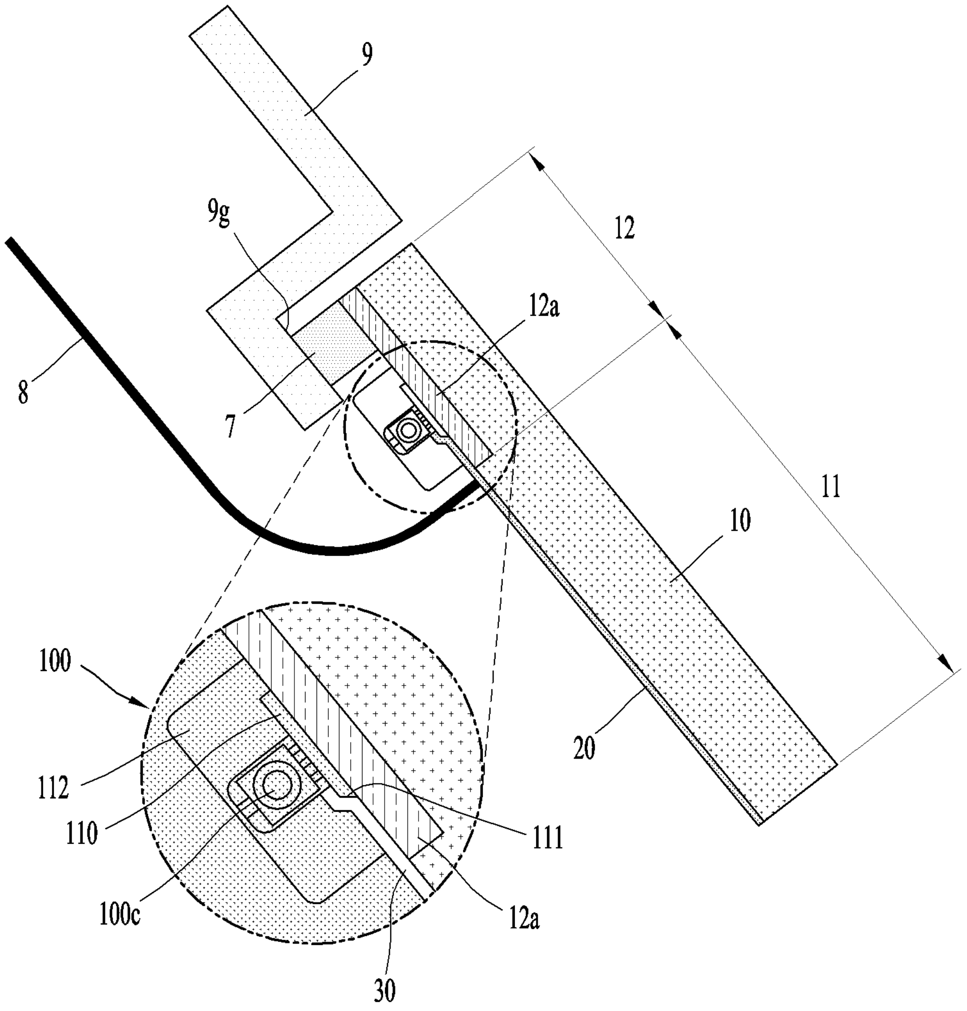
FIG. 4 is a sectional view illustrating a coupled state between the glass and the frame of the vehicle in FIG. 3.

Meanwhile, glass of a vehicle in which a transparent antenna module according to the present disclosure is implemented can be coupled to a frame of the vehicle. In this regard, FIG. 3 is a perspective view illustrating vehicle glass to be coupled or attached to a frame of a vehicle. FIG. 4 is a sectional view illustrating a coupled state between the glass and the frame of the vehicle in FIG. 3.

Referring to FIGS. 3 and 4, glass 10, 10' can be coupled or bonded to a frame 9 of the vehicle, to cover an opening **9*h* of the frame 9. For example, the glass 10, 10' can be glass of the vehicle 1, such as a front windshield 101, door glass 102, 103, quarter glass 104, a rear windshield, a side mirror, a sunroof 105, or lamp glass 106 (see FIG. 1**).

A groove **9*g* of the glass 10, 10' can extend along edges of the glass 10, 10', and define a boundary of the opening 9*h*. For example, the frame 9 can include a metallic material, and a sealant 7 can be filled between the groove 9*h* and the glass 10, 10'. The groove 9*g* can be formed to be stepped from an inner boundary of the frame 9. The glass 10 having an opaque region 12 can be disposed in the groove 9*g* which has a step from an inner end portion of the frame 9. As the glass 10 is disposed in the groove 9*g*, it can be considered that any step of the groove 9*g*** is not found from outside of the vehicle.

An antenna 20 can be located on one surface of the glass 10 or inside the glass 10. The antenna 20 can be transparent. The antenna 20 can be flexible.

A connection module including a connector **100*c* can be disposed between an edge of the glass 10, 10' and the antenna 20, and located on one surface of the glass 10, 10'. The connector 100*c* of the connection module can be electrically connected to the antenna 20 through a substrate 30. An inner cover 8 can be disposed opposite to the glass 10 with respect to the frame 9, and cover the connection module. The inner cover 8 can be referred to as an interior cover 8**. The connection module can be referred to as a connector device, a Fakra jack part, or a connector assembly.

Meanwhile, an antenna assembly for a vehicle having a transparent antenna module according to the present disclosure can be disposed on a transparent region and an opaque region of vehicle glass. In this regard, FIG. 5 is a view illustrating a structure of an antenna assembly and a connector disposed on a transparent region and an opaque region of vehicle glass.

Figure 5:
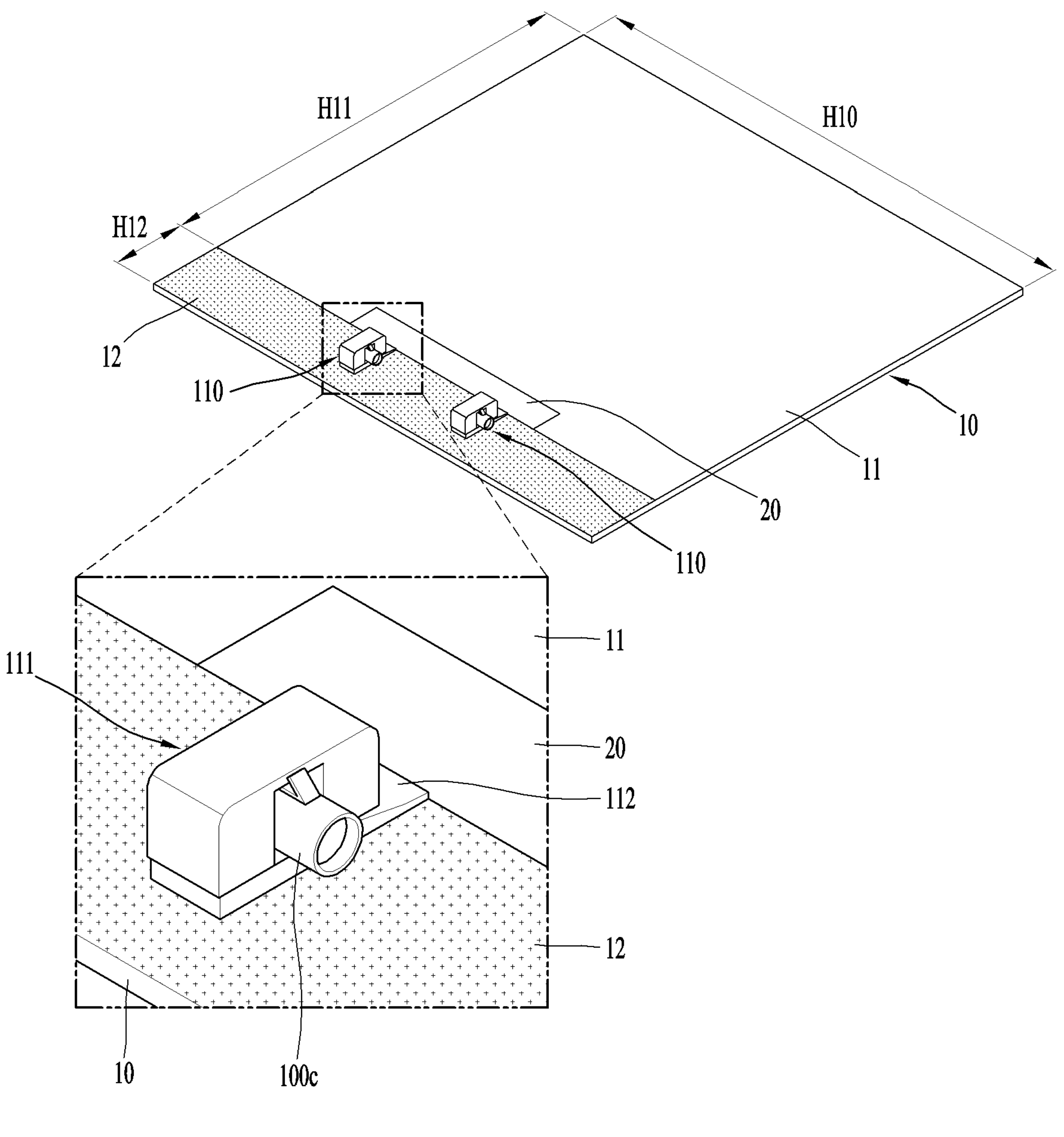
FIG. 5 is a view illustrating a structure of an antenna assembly and a connector disposed on a transparent region and an opaque region of vehicle glass.

Referring to FIG. 5, the glass 10 can include a transparent region 11 and an opaque region 12. The opaque region 12 can be a black mask region or a frit region. For example, the transparent region 11 can occupy most of the glass 10, and the opaque region 12 can be adjacent to one edge of the glass 10. The transparent region 11 and the opaque region 12 can have the same width W10, and a height H11 of the transparent region 11 can be higher than a height H12 of the opaque region 12.

The antenna 20 can be located on the transparent region 11 to be adjacent to a boundary between the transparent region 11 and the opaque region 12. The connector module including the connector 100*c* can be located on the opaque region 12. The connector 100*c* of the connection module can be connected to the antenna 20 through a housing bottom plate 111. The housing bottom plate 111 can be fastened to a housing top plate 112, to constitute a housing 110. The connector 100*c* can be received inside the housing 110. The housing 110 receiving the connector 100*c* therein can be disposed on the opaque region 12. On the other hand, at least portion of the connection module can alternatively be located on the transparent region 11.

Hereinafter, a transparent antenna module for a vehicle and an antenna assembly for a vehicle having the same according to the present disclosure will be described in detail. A transparent antenna disposed on vehicle glass is recognized as a next-generation antenna, in terms of no interference with vehicle design and high network expandability as well as implementation as a high-performance antenna. Since the transparent antenna can be installed on various positions, such as front glass, rear glass, side glass, ceiling glass, side mirror, front lamp, and the like, it is very advantageous in that the transparent antenna can be installed while maintaining its own design and communication configuration. On the other hand, the transparent antenna is manufactured based on a transparent film and thereby is vulnerable to scratches and the like. This urges consumer's caution.

The present disclosure is directed to solving the aforementioned problems and other drawbacks. Another aspect of the present disclosure is to provide an antenna assembly for a vehicle, in which a transparent antenna module is disposed, and a method for manufacturing the same. Another aspect of the present disclosure is to provide a transparent antenna for a vehicle, capable of minimizing a signal loss owing to invisible installation on vehicle glass and capable of being expanded to a 5G or V2X antenna owing to no limitation in installation area and space. Another aspect of the present disclosure is to provide an antenna assembly for a vehicle, provided therein with a transparent antenna module which does not spoil appearance of the vehicle and is applicable to various types of vehicles. Another aspect of the present disclosure is to propose a transparent antenna structure and a material thereof, capable of increasing wear resistance without limitations in scenes where a consumer actually uses a transparent antenna. Another aspect of the present disclosure is to propose a transparent antenna structure for a vehicle and a material thereof, capable of improving wear resistance to overcome disadvantages of the transparent antenna. Another aspect of the present disclosure is to provide a transparent antenna that is free from scratches, cleaning, and the like by proposing a transparent antenna structure and a material thereof in a structure, in which vehicle glass is implemented as double-bonded glass. Another aspect of the present disclosure is to provide an antenna assembly for a vehicle, provided with a transparent antenna module, which is applicable to a 5G communication vehicle, an autonomous vehicle, and the like, and a method for manufacturing the same.

Figure 6A:
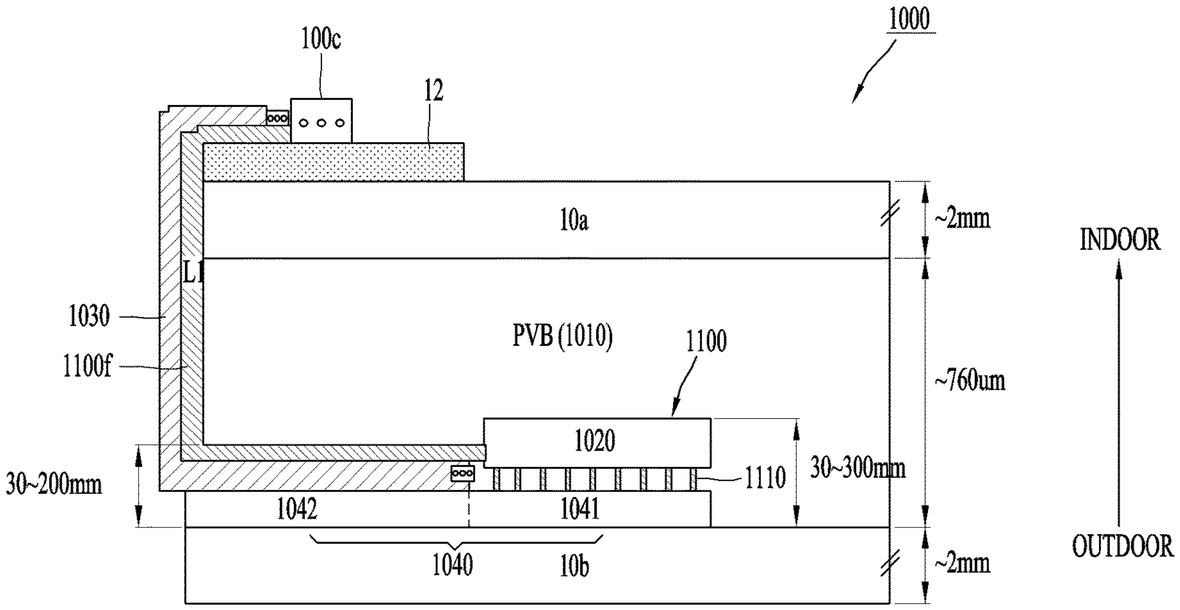
FIGS. 6A and 6B are sectional views illustrating an antenna assembly for a vehicle, disposed on double-bonded glass of the vehicle in accordance with embodiments.
Figure 6B:
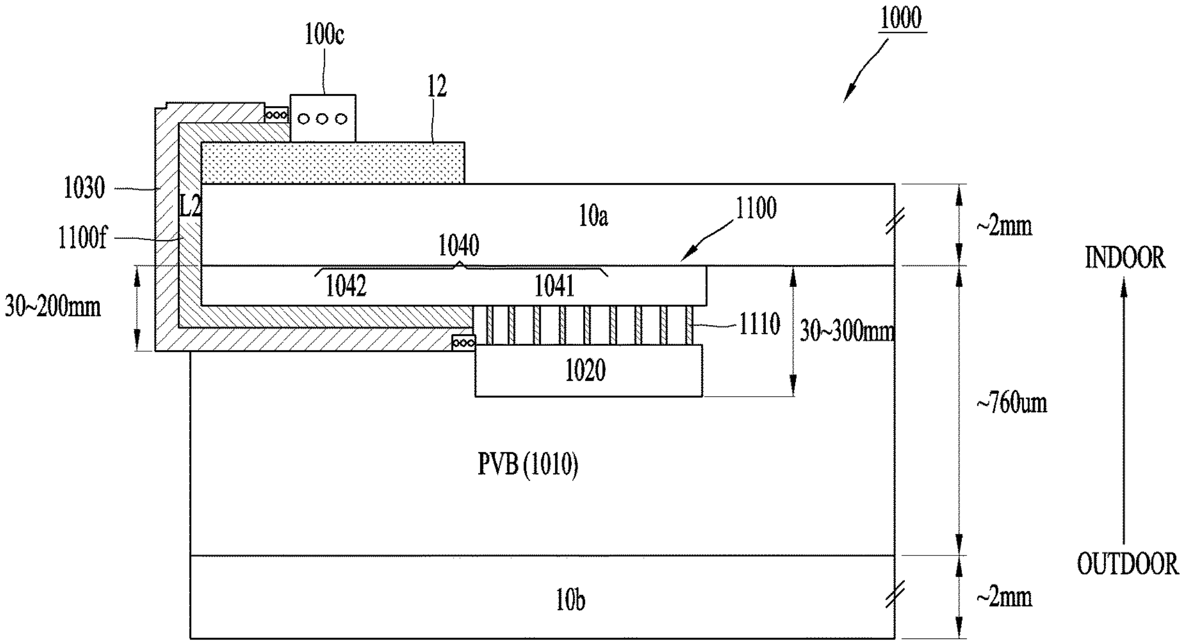

In this regard, FIGS. 6A and 6B are sectional views illustrating an antenna assembly for a vehicle, disposed on double-bonded glass of the vehicle in accordance with embodiments. On the other hand, FIG. 7 shows a sectional view and a partially enlarged view of an antenna assembly for a vehicle, disposed on double-bonded glass of a vehicle in accordance with the present disclosure.

Figure 7:
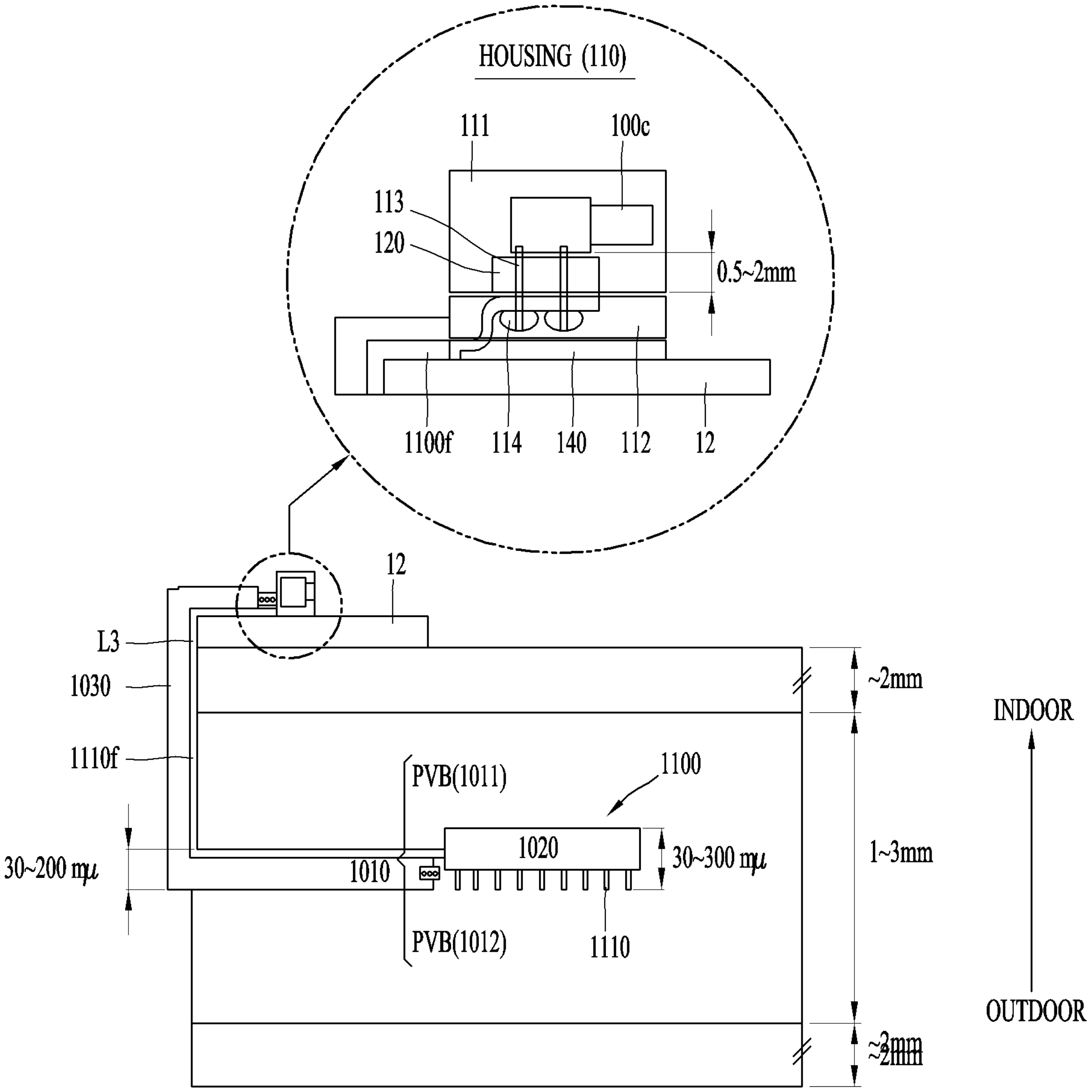
FIG. 7 shows a sectional view and a partially enlarged view of an antenna assembly for a vehicle, disposed on double-bonded glass of the vehicle in accordance with the present disclosure.

Referring to FIGS. 6A to 7, an antenna assembly 1000 can include a film layer 1010, a transparent substrate 1020, and a substrate 1030. The antenna assembly 1000 can further include first glass 10*a* and second glass 10*b*.

The first glass 10*a* can have a black mask region 12 on one surface thereof. The second glass 10*b* can be disposed opposite to the first glass 10*a*. The first glass 10*a* can be disposed to face an inner region (toward the interior) of the vehicle, while the second glass 10*b* can be disposed to face an outer region (toward the exterior) of the vehicle. The first glass 10*a* and the second glass 10*b* can constitute a double-bonded glass structure by a film layer 1010. The film layer 1010 can be made of polyvinyl butyral (PVB), but may not be limited thereto, and can vary depending on applications.

The film layer 1010 can be disposed between the first glass 10*a* and the second glass 10*b*. The transparent substrate 1020 can be disposed in an inner region of the film layer 1010. The transparent substrate 1020 can have an antenna transparent electrode portion 1110 in a mesh structure.

The substrate 1030 can have thereon a feed line 1100*f* that is electrically connected to the antenna transparent electrode portion 1110 of the transparent substrate 1020. At least a portion of the antenna transparent electrode portion 1110 can be disposed on an outer region of the black mask region 12. The antenna transparent electrode portion 1110 may not overlap with the black mask region 12 in a height direction, in order to be transparent. At least a portion of the feed line 1100*f* can be disposed to overlap the black mask region 12 in the height direction.

One end portion of the feed line 1100*f* that overlaps the black mask region 12 can be connected to the antenna transparent electrode portion 1110. The feed line 1100*f* can extend to a side surface portion of the double-bonded glass structure. Another end portion of the feed line 1100*f* can be connected to the connector 100*c* disposed on the black mask region 12.

The substrate 1030 with the feed line 1100*f* thereon can be formed of a flexible substrate. Referring to FIG. 6A, the transparent substrate 1020 and the flexible substrate 1030 can be bonded to the second glass 10*b* through a bonding layer 1040. Referring to FIG. 6B, the transparent substrate 1020 and the flexible substrate 1030 can be bonded to the first glass 10*a* through the bonding layer 1040. The bonding layer 1040 can include a first bonding layer 1041 bonded to the transparent substrate 1020 and a second bonding layer 1042 bonded to the flexible substrate 1030. The first bonding layer 1041 and the second bonding layer 1042 can have substantially the same height.

Referring to FIGS. 6A and 6B, a height from the bonding layer 1040 to an upper end portion of the flexible substrate 1030 can be in the range of 30 to 200 μm. A height from the transparent substrate 1020 and the bonding layer 1040 can be in the range of 30 to 300 μm. A thickness of each of the first glass 10*a* and the second glass 10*b* can be within a predetermined range based on 2 mm.

Referring to FIG. 6A, a structure in which the transparent antenna module 1100 and the feed line 1100*f* are disposed on the second glass 10*b* in an exterior direction of the double-bonded glass is illustrated. The structure is configured in term of the antenna such that the bonding layer is located on a top of the second glass, an antenna electrode is located on a top of the bonding layer, and a transparent substrate is located on a top of the antenna electrode. The transparent antenna module 1100 can have a thickness in the range of 30 to 300 mm in order to secure invisibility. The invisibility can increase as the thickness of the transparent antenna module 1100 decreases, but a thickness for securing mechanical durability can be set to 30 mm or more. A height difference (difference of altitude) can occur due to interference with the PVB layer 1010. Thus, the thickness of the transparent antenna module 1100 can be set to 300 mm or less.

The substrate 1030 with the feed line 1100*f* thereon can be bonded to the second glass 10*b* through the bonding layer 1040. The substrate 1030 with the feed line 1100*f* thereon can be formed of a polyimide material, and Cu electrode can be formed. The feed line 1100*f* has secured flexibility by a one-sided flexible Cu clad layer (FCCL) structure and the decrease in thickness, and accordingly can be manufactured to be easily bent into a shape of the vehicle glass. Mechanical durability is difficult to be secured when the thickness is 30 mm or less. Also, when the thickness is 200 mm or more, flexibility is lowered. This can cause a difficulty in bending into the shape of the vehicle glass. Therefore, the thickness of the substrate 1030 including the bonding layer 1040 can be in the range of 30 to 200 μm.

The transparent electrode portion 1110 and the feed line 1100*f* of the transparent antenna module 1100 can be connected by using an anisotropic conductive film (ACF). The feed line 1100*f* bent into the shape of the vehicle glass and the housing 110 connected to the TCU for vehicle communication can be disposed on the black mask region 12 in the interior direction of the vehicle. As the feed line 1100*f* and the housing 110 are disposed on the black mask region 12, the transparent antenna module 1100 and the feed line 1100*f* are invisible to a user.

Referring to FIG. 6B, a structure in which the transparent antenna module 1100 and the feed line 1100*f* are disposed on the interior first glass 10*a* of the double-bonded glass is illustrated. This structure is more advantageous in terms of productivity because tasks are carried out only on the first glass 10*a*. The transparent antenna module 1100 and the feed line 1100*f* can be formed in the same structure, and a Cu electrode layer can be disposed on the substrate 1030 bonded to the bonding layer 1040 on the side of the feed line 1100*f*.

Referring to FIG. 6A, a structure in which the transparent antenna module 1100 and the feed line 1100*f* are disposed on the exterior second glass 10*b* of the double-bonded glass is illustrated. The structure is configured in terms of the antenna such that the bonding layer is located on a top of the second glass, an antenna electrode is located on a top of the bonding layer, and a transparent substrate is located on a top of the antenna electrode. The transparent antenna module 1100 can have a thickness in the range of 30 to 300 mm in order to secure invisibility. The invisibility can increase as the thickness of the transparent antenna module 1100 decreases, but a thickness for securing mechanical durability can be set to 30 mm or more. A height difference (difference of altitude) can occur due to interference with the PVB layer 1010. Thus, the thickness of the transparent antenna module 1100 can be set to 300 mm or less.

As illustrated in FIGS. 6A and 6B, when the transparent antenna module 1100 and the feed line 1100*f* are disposed between the double-bonded glass of the vehicle, transparent is improved owning to invisibility of the transparent antenna module 1100. Also, as illustrated in FIGS. 6A and 6B, as the transparent antenna module 1100 and the feed line 1100*f* are disposed between the double-bonded glass of the vehicle, damages such as scratches, caused by the user's carelessness, can be suppressed.

Referring to FIG. 7, a detailed structure of an antenna assembly for a vehicle proposed in the present disclosure can be divided into the transparent antenna module 1100, the feed line 1100*f*, and the housing 110. The transparent antenna module 1100 disclosed herein has a structure located between the PVB layers of the double-bonded glass of the vehicle. The transparent antenna module 1100 includes the transparent substrate 1030 and the transparent electrode portion 1110 configuring a conductive pattern of the antenna.

The transparent antenna module 1100 can have of thickness in the range of 30 to 300 μm. As the thickness decreases, invisibility increases and transparency is improved accordingly. However, a minimum thickness for securing mechanical durability is set to 30 μm or more. On the other hand, the thickness of the transparent antenna module 1100 is 300 mm or more, a height difference (different of altitude) of the module occurs due to an increase in thickness between the PVB layers, thereby causing a difficulty in use.

The feed line 1100*f* connected to the transparent electrode portion 1110 of the transparent antenna module 1100 can be manufactured to secure flexibility by using the FCCL structure and decreasing the thickness in the present disclosure, and to be easily bent into the shape of the vehicle glass. In this regard, the thickness of the flexible substrate 1030 with the feed line 1100*f* thereon can be set to 30 to 200 μm. It can be difficult to secure mechanical durability when the thickness of the flexible substrate 1030 is 30 mm or less. When the thickness of the flexible substrate 1030 is 200 mm or more, flexibility is decreased. This causes a limitation in bending the feed line 1100*f* into the shape of the vehicle glass.

The feed line 1100*f* connected to the transparent electrode portion 1110 of the transparent antenna module 1100 can be manufactured to secure flexibility by using the FCCL structure and decreasing the thickness in the present disclosure, and to be easily bent into the shape of the vehicle glass. In this regard, the thickness of the flexible substrate 1030 with the feed line 1100*f* thereon can be set to 30 to 200 μm. It can be difficult to secure mechanical durability when the thickness of the flexible substrate 1030 is 30 mm or less. When the thickness of the flexible substrate 1030 is 200 mm or more, flexibility is decreased. This causes a limitation in bending the feed line 1100*f* into the shape of the vehicle glass.

The transparent electrode portion 1110 and the feed line 1100*f* of the transparent antenna module 1100 can be connected by using anisotropic conductive film (ACF). The feed line 1100*f* bent into the shape of the vehicle glass and the housing 110 connected to the TCU for vehicle communication can be disposed on the black mask region 12 in the interior direction of the vehicle. As the feed line 1100*f* and the housing 110 are disposed on the black mask region 12, the transparent antenna module 1100 and the feed line 1100*f* are invisible to a user.

The housing 110 can include a housing bottom plate 111 disposed on a bottom portion, and a housing top plate 112 disposed on a top portion. The housing bottom plate 111 can be fixed to the black mask region 12 using a bonding layer 140. A Fakra jack, on which the connector 100*c* is disposed, and the feed line 1100*f* can be disposed in a region where the housing bottom plate 111 is located, and fixed by use of the housing top plate 112.

If the flexible feed line 1100*f* is directly connected to the Fakra jack on which the rigid connector 100*c* is disposed, the feed line 1100*f* can be damaged or distorted due to soldering. To solve the problem in the present disclosure, a reinforcement plate 120 can be bonded onto the feed line 1100*f* and the connector 100*c* in the form of the Fakra jack can be disposed on the reinforcement plate 120, thereby suppressing damage or distortion of the feed line 1100*f* due to soldering. The reinforcement plate 120 can be made of a high-temperature resistant polymer material.

A thickness of the reinforcement plate 120 can be 0.5 mm or more to maintain sufficient rigidity, while being 2.0 mm or less to suppress an increase in size of the housing 110. Pins 113 disposed on the Fakra jack where the connector 100*c* is disposed can be connected in a soldering manner to the feed line 1100*f* from the lower portion.

According to the present disclosure, the transparent antenna module can be disposed between the double-bonded glass and a Fakra jack connecting portion can be configured by the housing 110, thereby firmly maintaining antenna performance even in severe environment conditions of the vehicle, such as high temperature.

Meanwhile, a transparent antenna module for a vehicle according to the present disclosure can be configured in a multi-layered structure. In this regard, FIG. 8 is a sectional view illustrating a transparent antenna module for a vehicle, which includes a transparent substrate and has a multi-layered structure.

Figure 8:
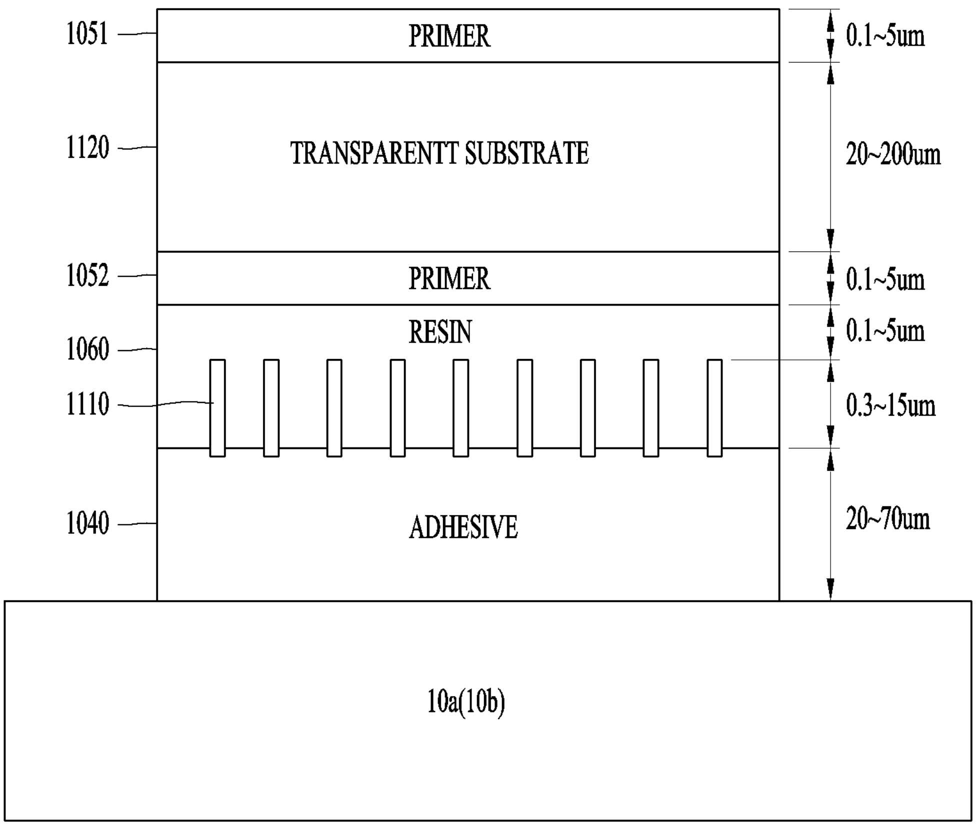
FIG. 8 is a sectional view illustrating a transparent antenna module for a vehicle, which includes a transparent substrate and has a multi-layered structure.

Referring to FIG. 8, a plurality of layers can be formed on the vehicle glass 10*a*, 10*b* in the order of a bonding layer 1040, an antenna transparent electrode portion 1110, a resin layer 1060, a second primer layer 1052, a transparent substrate 1020, and a first primer layer 1051.

The bonding layer 1040 can be manufactured by adding and mixing an inorganic material containing benzotriazole-based polymer, triazole-based polymer, or SiO2 (or TiO2), which is capable of absorbing UV, with an acrylic material, prepared by bonding of COOH and OH, as a base member. When each additive is mixed by 1 wt % or less, a UV blocking effect is insufficient. Also, when added by 30 wt % or more, a bonding characteristic can be lowered. Therefore, it is appropriate to add each additive by 1 to 30 wt %.

Each additive can be analyzed through composition analysis (EDS, XPS) or spectroscopy (FTIR, Raman). Bonding properties of the bonding layer 1040 can be lowered when the thickness of the bonding layer 1040 is 20 mm or less, and an invisibility characteristic can be lowered when the thickness is a predetermined value or more. Therefore, the thickness of the bonding layer 1040 can be in the range of 20 to 70 mm. It is advantageous for an adhesive to have a thermal expansion coefficient between glass and a metal electrode in order to alleviate thermal impact between an antenna and glass. The bonding layer 1040 according to the present disclosure can be an adhesive having a thermal expansion coefficient of 4 to 20 ppm/° C.

The antenna transparent electrode portion 1110 can be made of Cu or Ag, and manufactured by thin film sputtering/etching or imprinting. To secure antenna performance, the antenna transparent electrode portion 1110 demands a thickness of a predetermined level or more, and invisibility can be lowered when the antenna transparent electrode portion is too thick. Therefore, the thickness of the antenna transparent electrode portion 1110 can be in the range of 0.3 to 15 mm.

The resin layer 1060 can be used in order to increase bonding properties between the transparent substrate 1020 and the antenna transparent electrode portion 1110. A bonding force can be secured when the resin layer 1060 has a thickness of a predetermined value or more and invisibility can be lowered when it is too thick. Therefore, the resin layer 1060 can have a thickness in the range of 0.1 to 5 mm.

In order to generate a double-bonded glass, a PVB layer can be disposed between the first and second glass 10*a* and 10*b*, and bonded through high-temperature heat treatment. In this case, the temperature can typically be about 140 degrees. There is a need of durability for maintaining performance of the transparent antenna module 1100, which is disposed between the double-bonded glass, at a high temperature up to 140 degrees.

The present disclosure can implement an antenna at a high temperature, as compared to the existing substrate material, by use of first and second primer layers 1051 and 1052 that acrylic primer is applied onto both sides of the transparent substrate to secure durability at a high temperature. The transparent substrate 1020 can be made of a material, such as PET, cyclo olefin polymer (COP), colorless polyimide (CPI), or the like, which can be massively produced.

Referring to FIGS. 6A to 8, the antenna assembly 1000 can further include the first primer layer 1051 and the second primer layer 1052. The transparent antenna module 1100 can be configured by the first primer layer 1051, the transparent substrate 1020, the second primer layer 1052, the resin layer 1060 having the antenna transparent electrode portion 1110, and the bonding layer 1040.

The first primer layer 1051 and the second primer layer 1052 can be disposed on one surface and another surface of the transparent substrate 1020. One surface of the second primer layer 1052 can be bonded to another surface of the transparent substrate 1020. Another surface of the second primer layer 1052 can be bonded to one surface of the resin layer 1060 with the antenna transparent electrode portion 1110 thereon.

Referring to FIGS. 6A and 8, the transparent antenna module 1100 can be bonded to the second glass 10*b*. Another surface of the resin layer 1060 with the antenna transparent electrode portion 1110 can be bonded to the second glass 10*b* through the bonding layer 1040. The thickness of the PVB layer 1010 implemented as a film layer can be in a predetermined range based on 760 μm. A height from the transparent substrate 1020 and the bonding layer 1040 can be in the range of 30 to 300 μm. The height from the transparent substrate 1020 to the bonding layer 1040 can be ½ or less of the thickness of the PVB layer 1010.

Referring to FIGS. 6B and 8, the transparent antenna module 1100 can be bonded to the first glass 10*a*. Another surface of the resin layer 1060 with the antenna transparent electrode portion 1110 thereon can be bonded to the first glass 10*a* through the bonding layer 1040. The thickness of the PVB layer 1010 implemented as a film layer can be in a predetermined range based on 760 μm. A height from the transparent substrate 1020 and the bonding layer 1040 can be in the range of 30 to 300 μm. The height from the transparent substrate 1020 to the bonding layer 1040 can be ½ or less of the thickness of the PVB layer 1010.

Referring to FIGS. 6B and 8, the transparent antenna module 1100 can be bonded to the first glass 10*a*. Another surface of the resin layer 1060 with the antenna transparent electrode portion 1110 thereon can be bonded to the first glass 10*a* through the bonding layer 1040. The thickness of the PVB layer 1010 implemented as a film layer can be in a predetermined range based on 760 um. A height from the transparent substrate 1020 and the bonding layer 1040 can be in the range of 30 to 300 um. The height from the transparent substrate 1020 to the bonding layer 1040 can be ½ or less of the thickness of the PVB layer 1010.

Referring to FIGS. 7 and 8, the PVB layer 1010 can include a first PVB layer 1011 bonded to the second glass 10*b*, and a second PVB layer 1012 bonded to the first glass 10*a*. The transparent substrate 1020 can be disposed between the first PVB layer 1011 and the second PVB layer 1012. The feed line 1100*f* formed on the substrate 1030 can be formed through a side surface of the second PVB layer 1012 to have a first length L1.

Referring to FIGS. 6A and 8, the transparent substrate 1020 and the substrate 1030 can be bonded to the second glass 10*b* through the bonding layer 1040. The feed line 1100*f* formed on the substrate 1030 can be formed through a side surface of the PVB layer 1010 to have a second length L2. The second length L2 can be longer than the first length L1.

Referring to FIGS. 6B and 8, the transparent substrate 1020 and the substrate 1030 can be bonded to the first glass 10*a* through the bonding layer 1040. The feed line 1100*f* formed on the substrate 1030 can be formed through a side surface of the bonding layer to have a third length L3. The third length L3 can be shorter than the first length L1, which can reduce a signal loss of the feed line 1100*f*.

Figure 9:
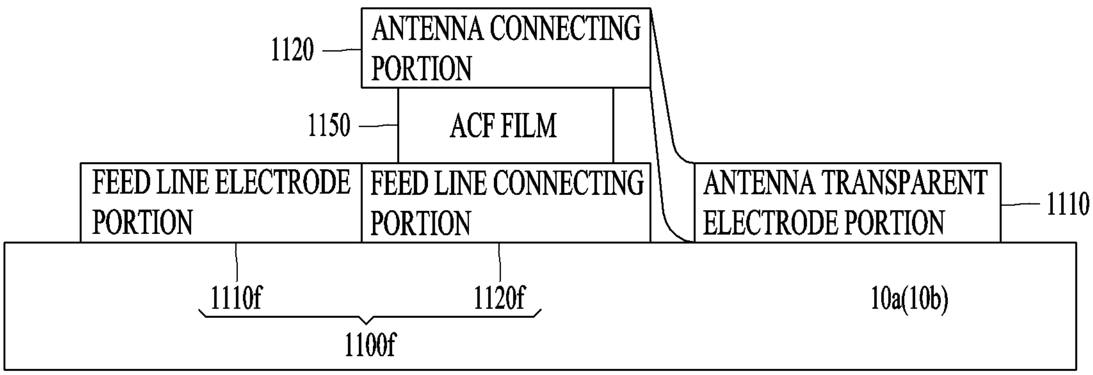
FIG. 9 is a sectional view illustrating a connection structure in which an antenna transparent electrode portion and a feed line are connected.
Figure 10:
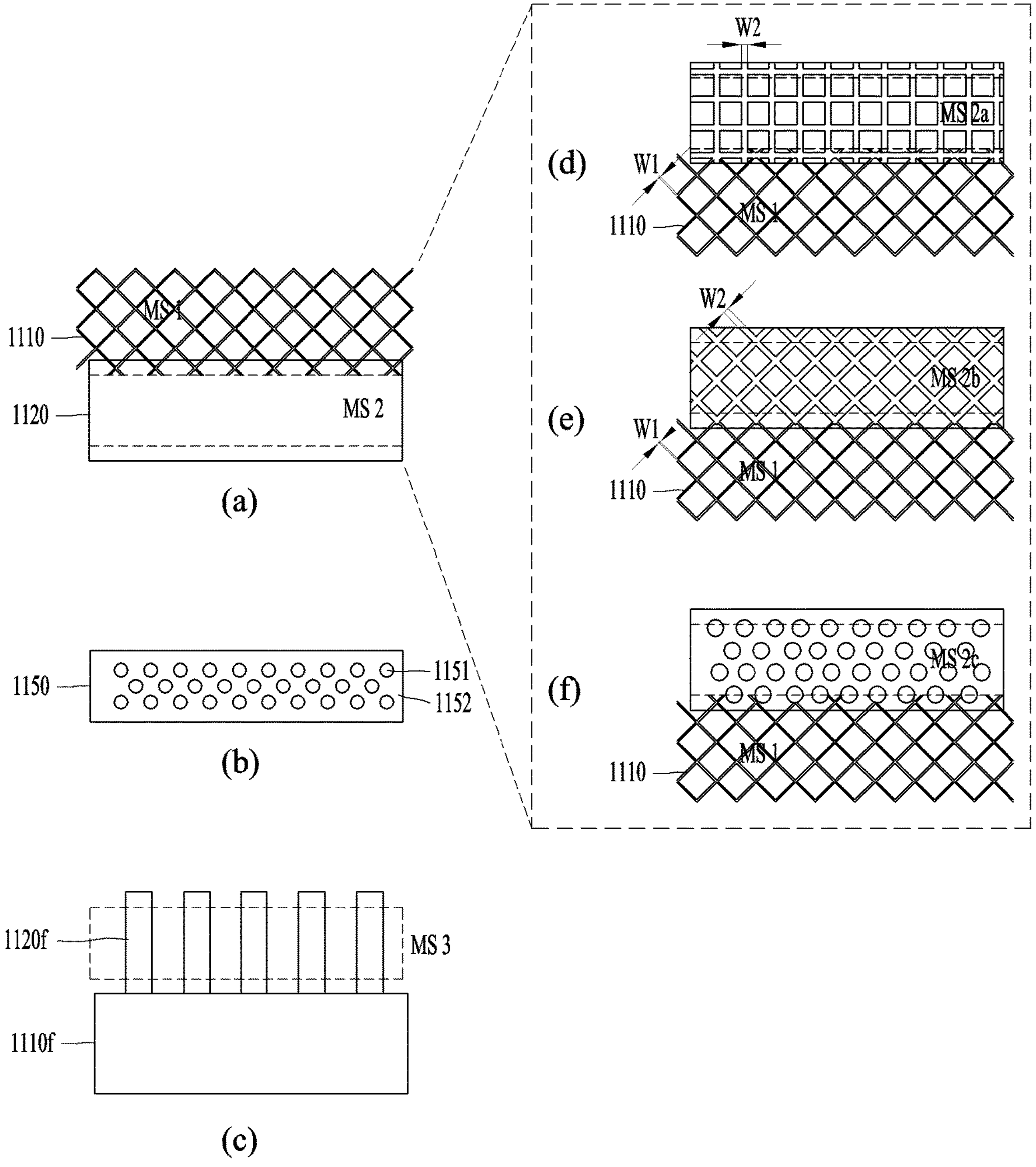
FIG. 10 is a view illustrating a metal pattern connection structure between an antenna transparent electrode portion and a feed line.

Meanwhile, the antenna transparent electrode portion of the antenna assembly for the vehicle and the feed line can be electrically connected to each other. In this regard, FIG. 9 is a sectional view illustrating a connection structure in which an antenna transparent electrode portion and a feed line are connected. FIG. 10 is a view illustrating a metal pattern connection structure between an antenna transparent electrode portion and a feed line.

Referring to FIG. 9, the feed line 1100*f* can include a feed line electrode portion 1110*f* and a feed line connecting portion 1120*f* disposed on a first layer. The antenna transparent electrode portion 1110 disposed on the first layer and an antenna connecting portion 1120 disposed on a second layer can be formed integrally with each other. The feed line connecting portion 1120*f* disposed on the first layer can be bonded to the antenna connecting portion 1120 disposed on the second layer through an ACF film 1150.

Detailed structures of the antenna connecting portion and the feed line connecting portion proposed in the present disclosure are illustrated in FIG. 9. A cross-sectional structure is configured, as illustrated in FIG. 9, such that the feed line connecting portion 1120*f*, the ACF film 1150, and the antenna connecting portion 1120 are sequentially disposed on the glass 10*a*, 10*b* of the vehicle. Afterwards, the feed line and the antenna are bonded through thermal compression. In the present disclosure, the thermal compression has been carried out under conditions of temperature of 120 to 180 degrees, pressure of 0.5 to 5 MPa, and 20 seconds, which can result in minimizing thermal impact.

Referring to FIG. 9 and (a) of FIG. 10, the antenna transparent electrode portion 1110 can be formed to have a first metal mesh pattern MS1. The antenna connecting portion 1120 can be formed to have a second metal mesh pattern MS2*a*, MS2*b*, MS2*c*. Referring to FIG. 9 and (b) of FIG. 10, the ACF film 1150 can include ACF balls 1151 and a resin film 1152. Referring to FIG. 9 and (c) of FIG. 10, the fee line connecting portion 1120*f* can be formed to have a third metal mesh pattern MS3. The second metal mesh pattern MS2 of the antenna connecting portion 1120 can be bonded to the third metal pattern MS3 of the feed line connecting portion 1120*f* through the ACF film 1150.

Referring to FIG. 9 and (d) of FIG. 10, the first metal mesh pattern MS1 can have metal mesh lines having a first width W1 disposed in a first axial direction and a second axial direction. The second metal mesh pattern MS2*a* can have metal mesh lines having a second width W2 disposed in the first axial direction and the second axial direction. The first axial direction and the second axial direction can be inclined by predetermined angles from a horizontal axial direction and a vertical axial direction.

Referring to FIG. 9 and (e) of FIG. 10, the second metal mesh pattern MS2*b* can have metal mesh lines having the second width W2 disposed in the first axial direction and the second axial direction. As illustrated in FIG. 9 and (c) of FIG. 10, the third metal pattern MS3 can have metal lines disposed in the vertical axial direction.

Electrode ratios of the second metal mesh patterns MS2*a* and MS2*b* of the antenna connecting portion 1120 can be set to 30% to 70%. An electrode ratio of the third metal mesh pattern MS3 of the feed line connecting portion 1120*f* can be set to 30% to 70%. The second width W2 of the second metal mesh patterns MS2*a* and MS2*b* can be wider than the first width W1 of the first metal mesh pattern MS1. The electrode ratio of the antenna transparent electrode portion 1110 can be lower than the electrode ratios of the second metal mesh patterns MS2*a* and MS2*b*. The electrode ratio of the antenna transparent electrode portion 1110 can be set to 30% or less.

When the ACF film 1150 is pressed at high temperature and high pressure, the ACF balls 1150 burst such that the feed line connecting portion 1120*f* and the antenna connecting portion 1120 are connected to each other. Contact resistance can be reduced when more of the ACF balls 1151 are in contact with the feed line connecting portion 1120*f* and the antenna connecting portion 1120, thereby minimizing antenna signal loss. The resin film 1152 connects the feed line connecting portion 1120*f* and the antenna connecting portion 1120 and controls bonding force for the two parts. Low (weak) bonding force means that force for bonding the two parts is reduced, and also force for supporting the overall antenna module is weakened, which frequently causes defects. Too low bonding force can bring about even a problem that the antenna and the feed line are separated from each other.

In order to solve those problems, the present disclosure proposes a structure that maximizes a contact area among the feed line connecting portion 1120*f*, the resin film 1152, and the antenna connecting portion 1120, to enable those parts to be in contact as firmly as possible. The feed line connecting portion 1120*f* can be implemented in an interdigital structure using Cu. The interdigital structure can increase the contact area with the antenna connecting portion 1120. Also, since an electrode structure has valleys, resin remains in the connecting portion without spilling over the connecting portion even when the resin melts, thereby enabling such bonding operation. An area that the electrode occupies in the feed line connecting portion 1120*f* is appropriately about 30 to 70%. In the electrode ratio of 30% or less, a small contact area with the antenna connecting portion 1120 is formed. This can generate contact resistance and cause signal loss. On the other hand, in the electrode ratio of 70% or more, a contact area with the antenna connecting portion is reduced due to small valleys, which does not help for improving bonding force.

The antenna connecting portion can be manufactured in a structure in which a conductive is filled. However, to maximize improvement of bonding force without causing a problem in contact resistance, the antenna connecting portion can be manufactured in the structure as illustrated in (d) to (e) of FIG. 10. (d) of FIG. 10 illustrates a structure in which the antenna connecting portion 1120 is formed by being rotated by a predetermined angle, for example, 45 degrees, with respect to the antenna transparent electrode portion 1110. (e) of FIG. 10 illustrates a structure in which the antenna transparent electrode portion 1110 and the antenna connecting portion 1120 are formed in parallel to each other.

(f) of FIG. 10 illustrates a structure in which an electrode of the antenna transparent electrode portion 1120 is formed as a circular electrode pattern. An area (electrode area) that the electrode occupies in the antenna connecting portion 1120 is appropriately about 30 to 70%. When the electrode area is 30% or less, a small contact area with the feed line connecting portion **1120*f*** is formed. This can generate contact resistance and cause signal loss. When the electrode area is 70% or more, a contact area with the antenna connecting portion is reduced due to small valleys, which does not help for improving bonding force.

The present disclosure can implement low contact resistance and high bonding force through the structure of the antenna connecting portion 1120 and the feed line connecting portion **1120*f*. By employing the structure of the antenna connecting portion 1120 and the feed line connecting portion 1120*f***, the signal loss between the antenna and the feed line can be reduced and defects that can occur while an operator handles can be remarkably decreased.

Referring to FIGS. 9 and 10, the antenna connecting portion 1120 can be coupled to the feed line connecting portion 1120 through the ACF film 1150. In detail, the antenna connecting portion 1120 connected to the antenna transparent electrode portion 1110 can be coupled to the feed line connecting portion **1120*f* connected to the feed line 1100*f*. The antenna connecting portion 1120 can be formed in a structure in which the Cu material is filled, but is not limited thereto. The feed line connecting portion 1120*f* having the interdigital structure through the ACF film 1150 in which the ACF balls 1151 burst can be coupled to the antenna connecting portion 1120 having the second mesh pattern MS2** to overlap it by a predetermined thickness.

Figure 11:
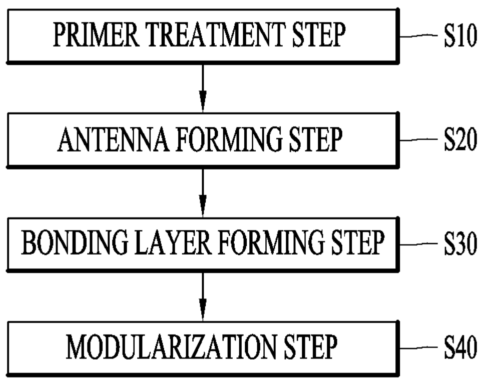
FIG. 11 is a flowchart illustrating a method for manufacturing a transparent antenna module of an antenna assembly for a vehicle in accordance with the present disclosure.
Figure 12:
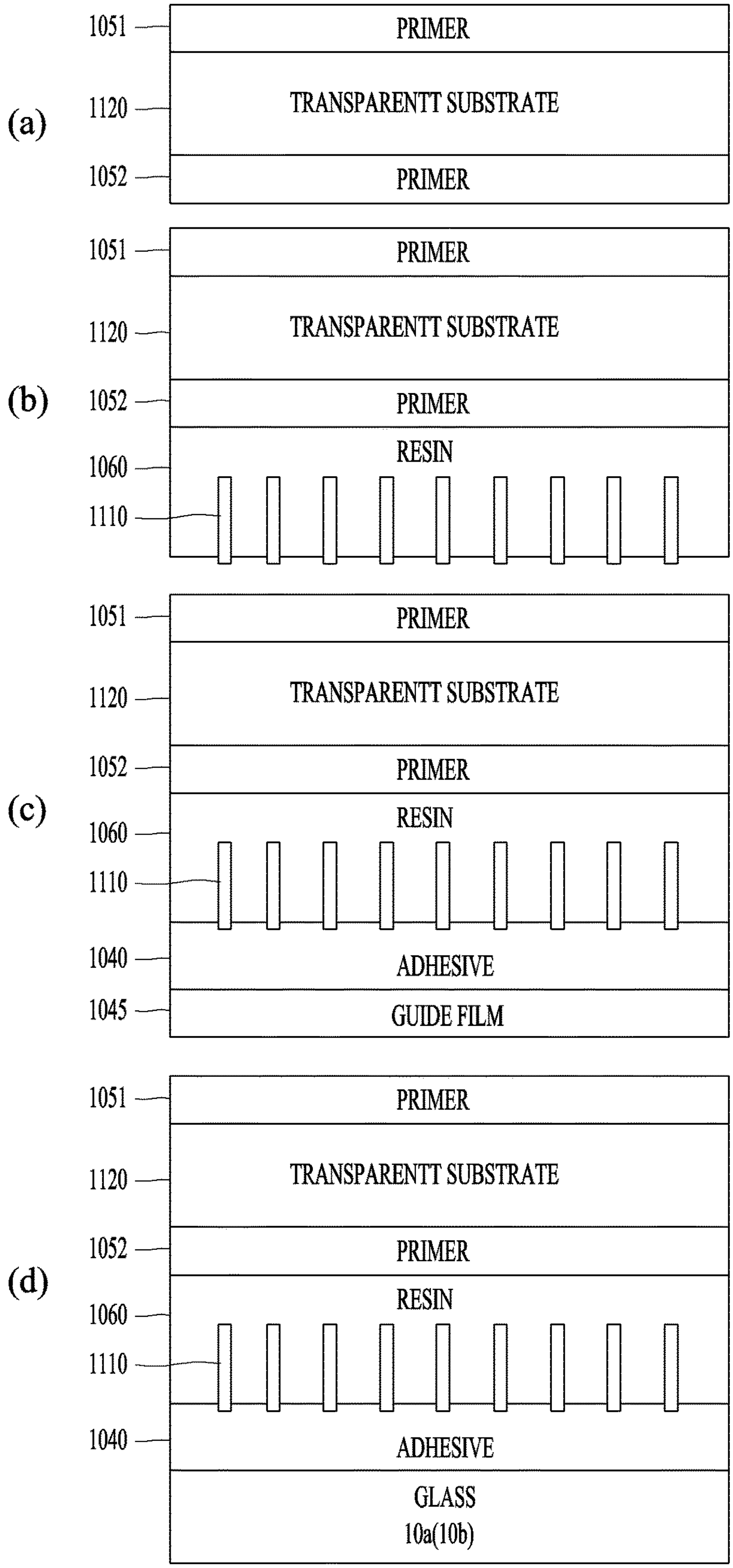
FIG. 12 is a view illustrating the structure of the transparent antenna module generated in each step of FIG. 11.

Meanwhile, a transparent antenna module for a vehicle according to the present disclosure can be implemented by forming a plurality of layers on a transparent substrate. In this regard, FIG. 11 is a flowchart illustrating a method for manufacturing a transparent antenna module of an antenna assembly for a vehicle in accordance with the present disclosure. FIG. 12 is a view illustrating the structure of the transparent antenna module generated in each step of FIG. 11.

Referring to FIG. 11, a method for manufacturing a transparent antenna module can include a primer treatment step (S10), an antenna forming step (S20), a bonding layer forming step (S30), and a modularization step (S40).

Referring to FIG. 11 and (a) of FIG. 12, in the primer treatment step (S10), the acrylic first and second primer layers 1051 and 1052 can be bonded to both surfaces of the transparent substrate 1020. Referring to FIG. 11 and (b) of FIG. 12, in the antenna forming step (S20), the resin layer 1060 can be formed on the second primer layer 1052 and the transparent electrode portion 1110 can be formed on the resin layer 1060.

Referring to FIG. 11 and (c) of FIG. 12, in the bonding layer forming step (S30), the bonding layer 1040 can be formed on the resin layer 1060 and a guide film 1045 can be bonded to the bonding layer 1040. Referring to FIG. 11 and (d) of FIG. 12, in the modularization step (S40), the transparent electrode portion 1110 of the transparent antenna module 1100, from which the guide film 1045 has been removed, can be attached to the first or second glass **10*a* or 10*b* through the bonding layer 1040**.

Referring to FIGS. 6A to 8, 11, and 12, in the modularization step (S40), the flexible substrate 1030 on which the feed line **1100*f* is formed can be connected to the transparent electrode portion 1110 of the transparent substrate 1020. One end portion of the feed line 1100*f* can be connected to the transparent electrode portion 1110 and another end portion of the feed line 1100*f* can be connected to the connector 100*c***.

Figure 13:
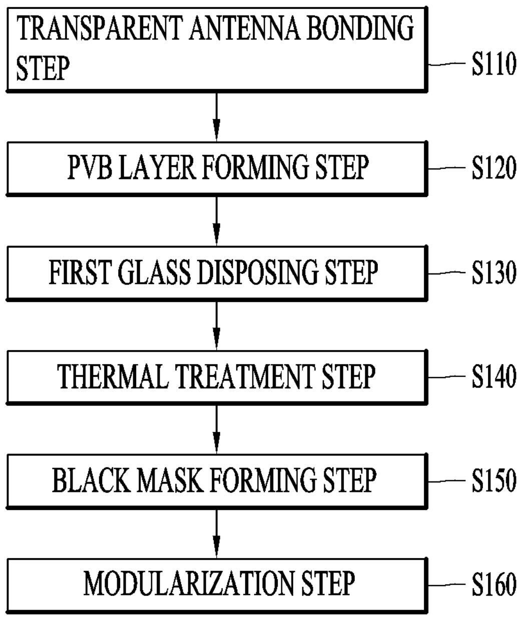
FIG. 13 is a flowchart illustrating a method for manufacturing an antenna assembly implemented in a double-bonded glass structure having a PVB layer in accordance with an embodiment.
Figure 14:
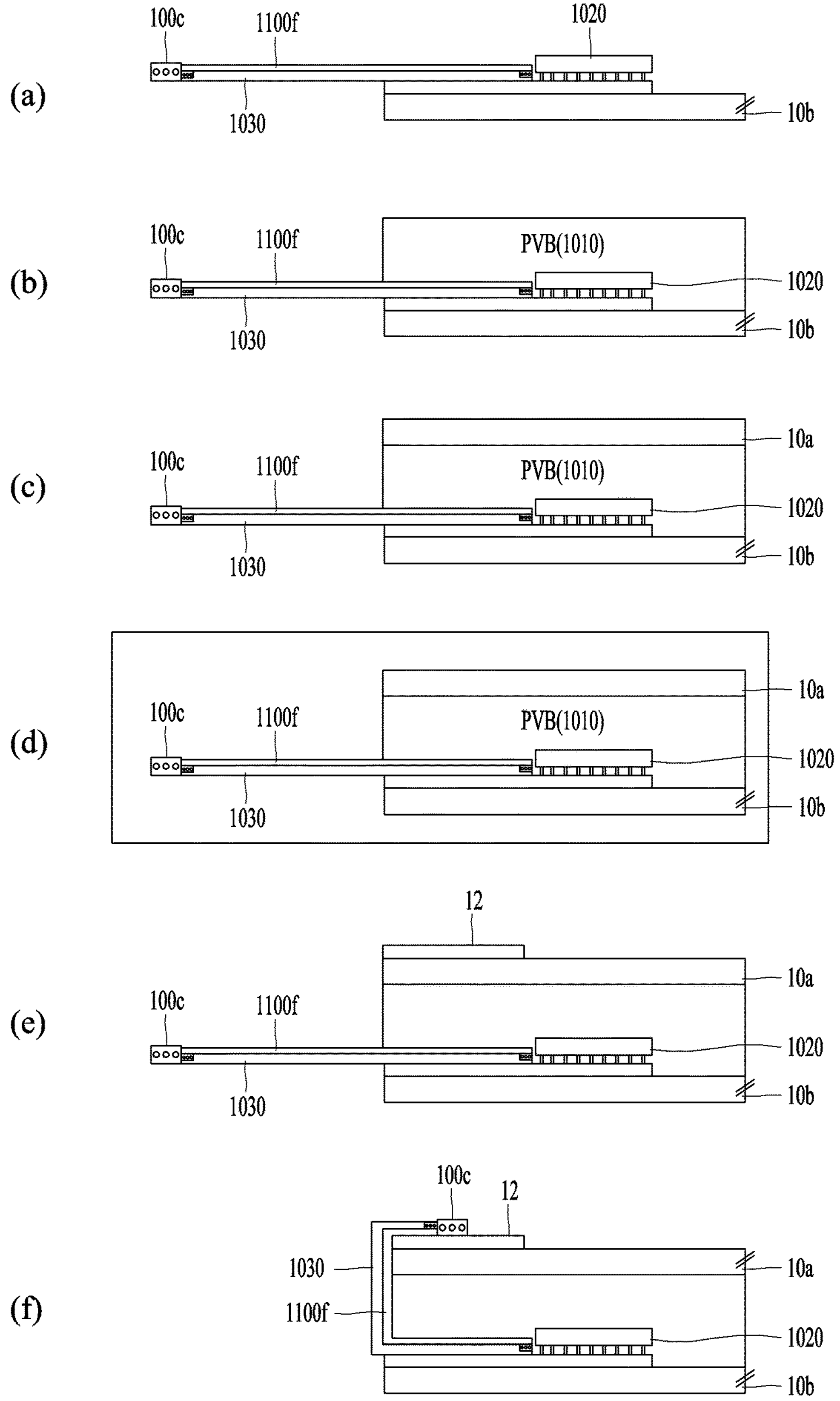
FIG. 14 is a view illustrating the structure of the antenna assembly generated in each step of FIG. 13.

Meanwhile, an antenna assembly according to the present disclosure can be implemented by a double-bonded glass structure having a PVB layer. In this regard, FIG. 13 is a flowchart illustrating a method for manufacturing an antenna assembly implemented in a double-bonded glass structure having a PVB layer in accordance with an embodiment. FIG. 14 is a view illustrating the structure of the antenna assembly generated in each step of FIG. 13.

Referring to FIG. 13, a method for manufacturing an antenna assembly can include a transparent antenna bonding step (S110), a PVB layer forming step (S120), and a first glass disposing step (S130). The method for manufacturing the antenna assembly can further include a thermal treatment step (S140), and a modularization step (S160).

Referring to FIG. 13 and (a) of FIG. 14, in the transparent antenna bonding step (S110), the transparent substrate 1020 connected to the flexible substrate 1030 can be disposed on the second glass **10*b*. Referring to FIG. 13 and (b) of FIG. 14, in the PVB layer forming step (S120), the PVB layer 1010 can be formed in a top region of the second glass 10*b* and the transparent substrate 1020. Accordingly, the second glass 10*b* can be disposed on a rear surface of the PVB layer 1010. The first glass 10*a* can be disposed on a front surface of the PVB layer 1010 in the first glass disposing step (S130**).

In the thermal treatment step (S140), the PVB layer 1010 disposed between the first glass **10*a* and the second glass 10*b* can be thermally treated, such that the first glass 10*a* and the second glass 10*b* can be bonded to the PVB layer 1010. In the black mask forming step (S150), the black mask region 12 can be formed on the front surface of the first glass 10*a*. Referring to FIGS. 6A, 8, 13, and 14, in the modularization step (S160), the feed line 1100*f* disposed on the flexible substrate 1030 can be coupled to a side surface of the double-bonded glass structure and the connector 100*c* can be bonded to the black mask region 12**.

Figure 15:
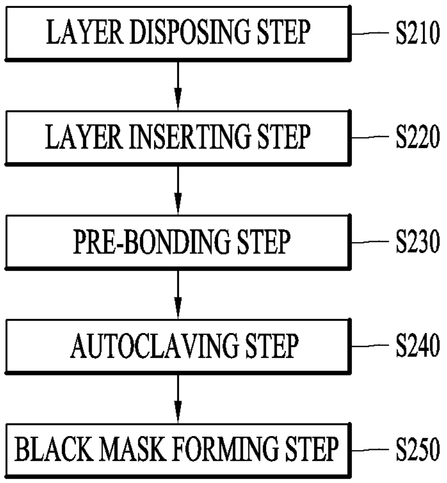
FIG. 15 is a flowchart illustrating a method for manufacturing an antenna assembly implemented in a double-bonded glass structure having a PVB layer in accordance with another embodiment.
Figure 16:
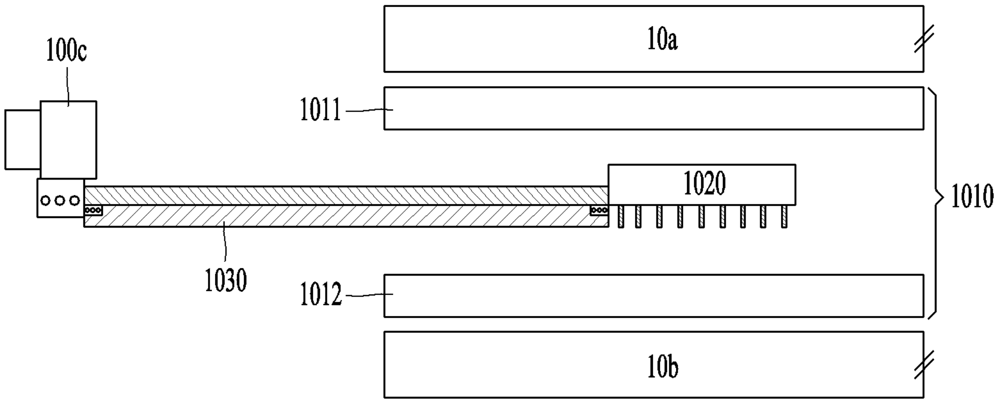
FIG. 16 is a view illustrating the structure of the antenna assembly generated in each step of FIG. 15.
Figure 16:
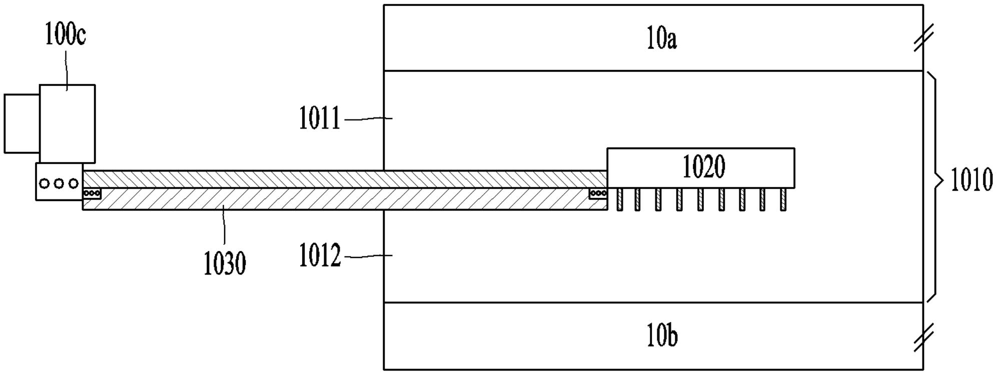
Figure 16:
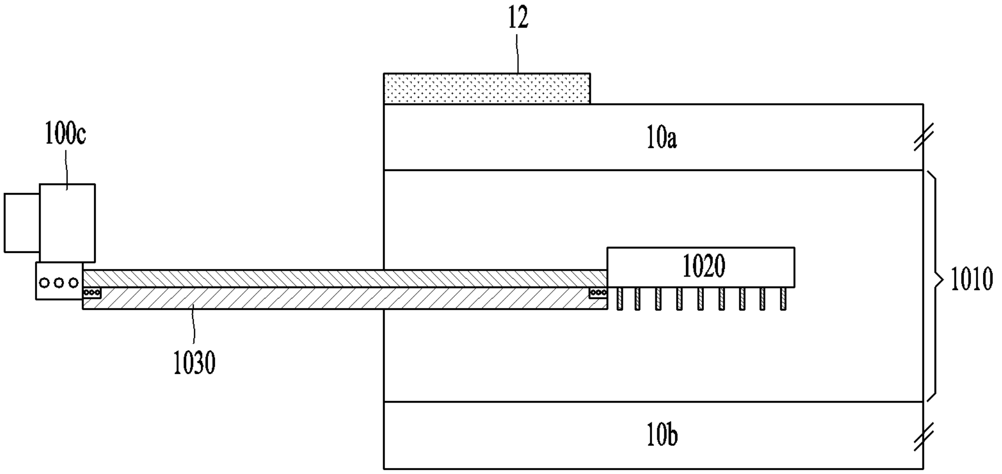

Meanwhile, an antenna assembly according to the present disclosure can be implemented by a double-bonded glass structure having a PVB layer. In this regard, FIG. 15 is a flowchart illustrating a method for manufacturing an antenna assembly implemented in a double-bonded glass structure having a PVB layer in accordance with another embodiment. FIG. 16 is a view illustrating the structure of the antenna assembly generated in each step of FIG. 15.

Referring to FIG. 15, a method for manufacturing an antenna assembly can include a layer disposing step (S210), a pre-bonding step (S230), an autoclaving step (S240), and a black mask forming step (S250). The method for manufacturing the antenna assembly can further include a layer inserting step (S220).

Referring to FIG. 15 and (a) of FIG. 6, in the layer disposing step (S210), the first PVB layer 1011 can be disposed on the second glass 10*b*. The first glass 10*a* can be disposed on the second PVB layer 1012 in the layer disposing step S210. In the layer inserting step (S220), the transparent substrate 1020 connected to the flexible substrate 1030 can be inserted between the first PVB layer 1011 and the second PVB layer 1012.

In another example, the plurality of layers can be sequentially disposed through the layer disposing step S210 without the layer inserting step S220. In this regard, in the layer disposing step S210, the first PVB layer 1011 can be disposed on the second glass 10*b* and the transparent substrate 1020 connected to the flexible substrate 1030 can be disposed on the first PVB layer 1011. In the layer disposing step S210, the second PVB layer 1012 can be disposed on the transparent substrate 1020 and the first glass 10*a* can be disposed on the second PVB layer 1012.

Referring to FIG. 15 and (b) of FIG. 16, in the pre-bonding step (S230), thermal treatment can be performed in a first temperature range to pre-bond the second PVB layer 1012 and the first PVB layer 1011 onto the first glass 10*a* and the second glass 10*b*. In the pre-bonding step S230, the first glass 10 and the second glass 10*b* can be bonded through thermal treatment for 30 minutes or longer within a temperature range of 120 to 130 degrees.

In the autoclaving step (S240), an autoclaving process can be performed to bond the second PVB layer 1012 and the first PVB layer 1011 onto the first glass 10*a* and the second glass 10*b* through thermal treatment in a second temperature range. A lower-limit value of the second temperature range in the autoclaving step S240 can be set to a value greater than or equal to an upper-limit value of the first temperature range of the pre-bonding step S230. In the autoclaving step S240, the first glass 10 and the second glass 10*b* can be bonded through thermal treatment for 30 minutes or longer within a temperature range of 130 to 140 degrees.

Referring to FIG. 14 and (c) of FIG. 16, in the black mask forming step (S250), the black mask region 12 can be formed on the front surface of the first glass 10*a*.

Figure 17:
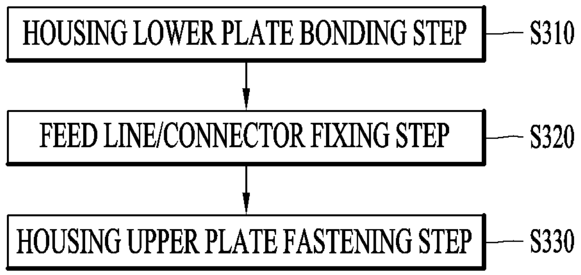
FIG. 17 is a flowchart illustrating a method for manufacturing an antenna assembly in which a connector connected to a feed line is fixedly bonded to a black mask region of glass.
Figure 18:
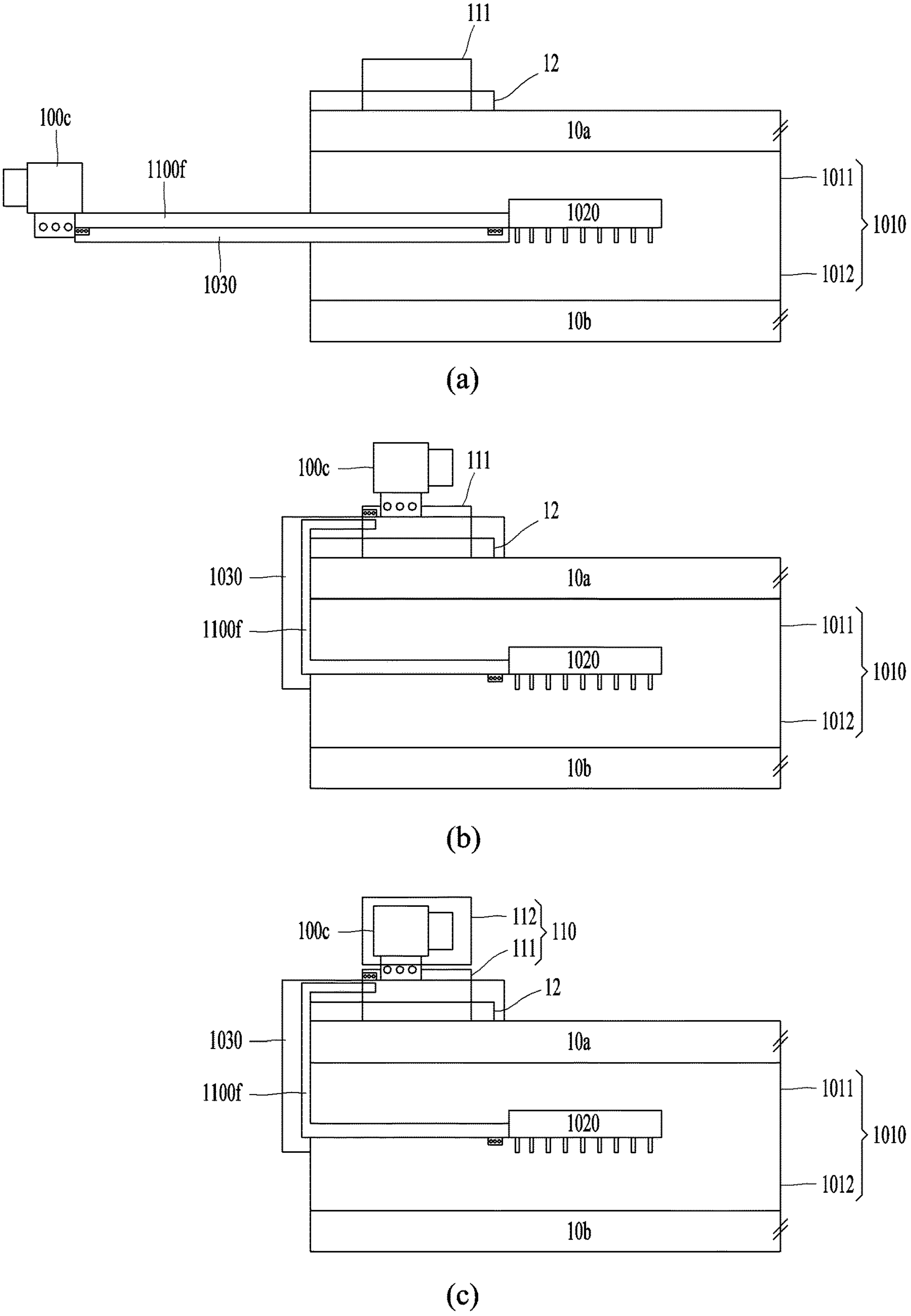
FIG. 18 is a view illustrating the structure of the antenna assembly generated in each step of FIG. 17.

Meanwhile, in an antenna assembly according to the present disclosure, a connector connected to a feed line of a flexible substrate can be fixedly bonded to a black mask region of glass. In this regard, FIG. 17 is a flowchart illustrating a method for manufacturing an antenna assembly in which a connector connected to a feed line is fixedly bonded to a black mask region of glass. FIG. 18 is a view illustrating the structure of the antenna assembly generated in each step of FIG. 17.

Referring to FIG. 17, a method for manufacturing an antenna assembly can include a housing bottom plate bonding step (S310), a feed line/Fakra connector fixing step (S320), and a housing top plate fastening step (S330). Referring to FIG. 18, the method for manufacturing the antenna assembly of FIG. 17 is applied to the structure having the first and second PVB layers of FIGS. 7 and 16, but is not limited thereto. The method for manufacturing the antenna assembly of FIG. 17 can also be applied to the structure in which the transparent substrate 1020 is bonded to the second glass 10*b* or the first glass 10*a* as illustrated in FIG. 6A or 6B.

Referring to FIG. 17 and (b) of FIG. 18, in the housing bottom plate bonding step (S310), the housing bottom plate 111 can be bonded to the black mask region 12. In the feed line/Fakra connector fixing step (S320), the feed line 1100*f* formed on the flexible substrate 1030 can be coupled to the side surface of the second PVB layer 1012. In this regard, depending on the structure in which the transparent substrate 1020 or the flexible substrate 1030 is disposed, the feed line 1100*f* formed on the flexible substrate 1030 can be coupled to the side surface of the PVB layer 1010 of FIG. 6A or the bonding layer 1040 of FIG. 6B.

Referring to FIG. 17 and (b) of FIG. 18, in the feed line/Fakra connector fixing step (S320), the connector 100*c* can be bonded to the black mask region in the state where it is inserted into the housing bottom plate 111. Accordingly, in the feed line/Fakra connector fixing step S320, the feed line 1100*f* and the Fakra jack portion on which the connector is disposed can be bent to correspond to the shape of the double-bonded glass structure, to be fixed to the housing bottom plate 111. Also, the feed line 1100*f* and the Fakra jack portion having the connector 100*c* thereon can be inserted into the housing structure having the housing bottom plate 111 and the housing top plate 112 fastened to the housing bottom plate 111. In this regard, referring to FIG. 17 and (c) of FIG. 18, in the housing top plate fastening step (S330), the housing top plate 112 can be fastened to the housing bottom plate 111. The housing top plate 111 can be fastened to the housing bottom plate 112, to constitute the housing 110.

So far, the transparent antenna module and the method for manufacturing the same according to the present disclosure have been described. Hereinafter, technical effects of the transparent antenna module and the method for manufacturing the same according to the present disclosure will be described.

The present disclosure can provide an antenna assembly for a vehicle, in which a transparent antenna module capable of being used for 5G, V2X, GNSS, and satellite broadcast communications is disposed, and a method for manufacturing the same.

The present disclosure can provide a transparent antenna module that is capable of being installed on side glass, front glass, sunroof, rear glass, side mirror, head lamp and the like of a vehicle, and avoiding limitations in vehicle design, and a method for manufacturing the same.

The present disclosure can provide a transparent antenna module that can maintain high wear resistance of an antenna structure exposed to outside while maintaining bonding force even in various environments such as high temperature, thermal impact, infrared rays, and the like, and a method for manufacturing the same.

The present disclosure can provide an antenna assembly for a vehicle, in which a transparent antenna module having a structure capable of being disposed between double-bonded glass, and a method for manufacturing the same.

The present disclosure can provide an antenna assembly for a vehicle, in which a transparent antenna and a feed line are disposed on a PVB layer between a first glass and a second glass in a glass/PVB/glass structure, and a connector part connected to a TCU of the vehicle is disposed on a black mask region, and a method for manufacturing the same.

The present disclosure can provide an antenna assembly for a vehicle, having a structure in which a transparent antenna is not damaged owing to protection by glass while the transparent antenna and a feed line are invisible to a user of the vehicle, and a method for manufacturing the same.

Further scope of applicability of the present disclosure will become apparent from the following detailed description. It should be understood, however, that the detailed description and specific examples, such as the preferred embodiments of the present disclosure, are given by way of illustration only, since various modifications and alternations within the spirit and scope of the disclosure will be apparent to those skilled in the art.

In relation to the present disclosure, the transparent antenna module and the method for manufacturing the same can be implemented as computer-readable codes in a program-recorded medium. The computer-readable medium can include all types of recording devices each storing data readable by a computer system. Examples of such computer-readable media can include hard disk drive (HDD), solid status disk (SSD), silicon disk drive (SDD), ROM, RAM, CD-ROM, magnetic tape, floppy disk, optical data storage element and the like. Also, the computer-readable medium can also be implemented as a format of carrier wave (e.g., transmission via an Internet). The computer can include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna assembly for a vehicle, the antenna assembly comprising:

a first glass including a black mask region;

a second glass disposed opposite to the first glass;

a film layer disposed between the first glass and the second glass;

a transparent substrate disposed in an inner region of the film layer, the transparent substrate including an antenna transparent electrode portion;

a first primer layer disposed on a first surface of the transparent substrate;

a second primer layer disposed on a second surface of the transparent substrate; and a substrate and a feed line disposed on the substrate, the feed line being electrically connected to the antenna transparent electrode portion of the transparent substrate, wherein at least a portion of the antenna transparent electrode portion overlaps with the black mask region, wherein at least a portion of the feed line is disposed to overlap the black mask region, and wherein a first surface and a second surface of the second primer layer are respectively bonded to the first surface of the transparent substrate and a first surface of a resin layer, on which the antenna transparent electrode portion is formed.

2. The antenna assembly of claim 1, wherein the antenna transparent electrode portion has a mesh structure.

3. The antenna assembly of claim 1, wherein the first glass is configured to face an inner region of the vehicle, and the second glass is configured to face an outer region of the vehicle, wherein the first glass and the second glass are bonded by the film layer to form a double-bonded glass structure, and wherein the film layer is a polyvinyl butyral (PVB) layer.

4. The antenna assembly of claim 3, wherein a second surface of the resin layer is bonded to the second glass through a bonding layer, wherein the PVB layer has a thickness that is less than or equal to 3 mm, and a height from the transparent substrate to the bonding layer is 30 μm to 300 μm.

5. The antenna assembly of claim 3, wherein a second surface of the resin layer is bonded to the first glass through a bonding layer, and wherein the PVB layer has a thickness that is less than or equal to 3 mm, and a height from the transparent substrate to the bonding layer is 30 μm to 300 μm.

6. The antenna assembly of claim 5, wherein the PVB layer includes:

a first PVB layer bonded to the second glass; and a second PVB layer bonded to the first PVB layer and the first glass, wherein the second surface of the resin layer is bonded to the first PVB layer by the bonding layer, and wherein the thickness of the PVB layer is 1 mm to 3 mm, and the height from the transparent substrate to the bonding layer is 30 μm to 300 μm.

7. The antenna assembly of claim 3, wherein the transparent substrate and the substrate are bonded to the second glass by a bonding layer, and wherein the feed line is disposed along a side surface of the PVB layer.

8. The antenna assembly of claim 3, wherein the transparent substrate and the substrate are bonded to the first glass by a bonding layer, and wherein the feed line is formed along a side surface of the bonding layer.

9. The antenna assembly of claim 3, wherein the feed line includes a feed line electrode portion and a feed line connecting portion disposed on a first layer, wherein the antenna transparent electrode portion disposed on the first layer is formed integrally with an antenna connecting portion disposed on a second layer, and wherein the feed line connecting portion disposed on the first layer is bonded to the antenna connecting portion disposed on the second layer through an anisotropic conductive film (ACF) film.

10. The antenna assembly of claim 9, wherein the antenna transparent electrode portion is a first metal mesh pattern, wherein the antenna connecting portion is a second metal mesh pattern, wherein the feed line connecting portion is a third metal mesh pattern, wherein the second metal mesh pattern of the antenna connecting portion is bonded to the third metal mesh pattern of the feed line connecting portion, and wherein the first metal mesh pattern, the second metal mesh pattern and the third metal mesh pattern are different from each other.

11. The antenna assembly of claim 9, wherein a first metal mesh pattern has metal mesh lines having a first width in a first axial direction and a second axial direction, wherein a second metal mesh pattern has metal mesh lines having a second width in the first axial direction and the second axial direction or in a horizontal axial direction and a vertical axial direction, the second width being different than the first width, and wherein a third metal mesh pattern has metal lines formed in the vertical axial direction.

12. The antenna assembly of claim 11, wherein the second metal mesh pattern of the antenna connecting portion has an electrode ratio of metal to empty space of 30% to 70%, wherein the third metal mesh pattern of the antenna connecting portion has an electrode ratio of metal to empty space of 30% to 70%, and wherein the second width is wider than the first width, and the antenna transparent electrode portion has an electrode ratio of metal to empty space of 30% or less.

13. The antenna assembly of claim 3, wherein the first primer layer and the second primer layer are formed of an acrylic material and bonded on both surfaces of the transparent substrate, wherein the resin layer is disposed on the second primer layer, and the transparent electrode portion is disposed on the resin layer, wherein a bonding layer is disposed on the resin layer, and a guide film is bonded to the bonding layer, wherein a flexible substrate having the feed line thereon is connected to the transparent electrode portion of the transparent substrate, and wherein one end portion of the feed line is connected to the transparent electrode portion and another end portion of the feed line is connected to a connector.

14. The antenna assembly of claim 13, wherein the transparent substrate is disposed on the second glass, wherein the PVB layer is disposed on the second glass and a top region of the transparent substrate, and the second glass is disposed on a rear surface of the PVB layer, wherein the first glass is disposed on a front surface of the PVB layer, wherein the first glass and the second glass are bonded to the PVB layer by thermally treating the PVB layer, wherein the black mask region is on a front surface of the first glass, and wherein the feed line is coupled to a side surface of the double-bonded glass structure and the connector is bonded to the black mask region.

15. The antenna assembly of claim 1, wherein one end portion of the feed line overlaps with the black mask region and the one end portion of the feed line is connected to the antenna transparent electrode portion, wherein the feed line extends to a side surface portion of a double-bonded glass structure, and wherein another end portion of the feed line is connected to a connector disposed on the black mask region.

16. The antenna assembly of claim 15, wherein the substrate having the feed line is a flexible substrate, wherein the transparent substrate and the flexible substrate are bonded to the first glass or the second glass by a bonding layer, wherein a height from the bonding layer to an upper end portion of the flexible substrate is 30 μm to 200 μm, and wherein a height from the transparent substrate to the bonding layer is 30 μm to 300 μm.

17. An antenna assembly for a vehicle, the antenna assembly comprising:

a first glass including a black mask region;

a second glass disposed opposite to the first glass;

a film layer disposed between the first glass and the second glass;

a transparent substrate disposed in an inner region of the film layer, the transparent substrate including an antenna transparent electrode portion; and a substrate and a feed line disposed on the substrate, the feed line being electrically connected to the antenna transparent electrode portion of the transparent substrate, wherein at least a portion of the antenna transparent electrode portion overlaps with the black mask region, wherein the film layer is a polyvinyl butyral (PVB) layer, wherein the PVB layer includes:

a first PVB layer bonded to the second glass; and a second PVB layer bonded to the first PVB layer and the first glass, wherein the transparent substrate is disposed between the first PVB layer and the second PVB layer, and wherein the feed line is disposed along a side surface of the second PVB layer.

18. The antenna assembly of claim 17, wherein the first PVB layer is disposed on the second glass, wherein the first glass is disposed on the second PVB layer, and wherein the transparent substrate is inserted between the first PVB layer and the second PVB layer.

19. The antenna assembly of claim 18, wherein the second PVB layer and the first PVB layer are pre-bonded to the first glass and the second glass through thermal treatment in a first temperature range, wherein an autoclaving process is performed to bond the second PVB layer and the first PVB layer to the first glass and the second glass through thermal treatment in a second temperature range, wherein a lower-limit value of the second temperature range is set to a value greater than or equal to an upper-limit value of the first temperature range, and wherein the black mask region is on a front surface of the first glass.

20. The antenna assembly of claim 19, wherein a housing bottom plate is bonded to the black mask region, wherein the feed line is coupled to the side surface of the second PVB layer, and a connector is bonded to the black mask region in a state of being inserted into the housing bottom plate, and wherein a housing top plate is fastened to the housing bottom plate.

* * * * *